(12) United States Patent
Snyder et al.

(10) Patent No.: US 12,270,469 B2
(45) Date of Patent: Apr. 8, 2025

(54) SYSTEMS AND METHODS FOR SHIFTING MULTI-SPEED TRANSMISSIONS

(71) Applicant: Brunswick Corporation, Mettawa, IL (US)

(72) Inventors: Matthew W. Snyder, Fond du Lac, WI (US); Justin R. Poirier, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 623 days.

(21) Appl. No.: 17/667,243

(22) Filed: Feb. 8, 2022

(65) Prior Publication Data

US 2022/0252149 A1  Aug. 11, 2022

Related U.S. Application Data

(60) Provisional application No. 63/147,972, filed on Feb. 10, 2021.

(51) Int. Cl.
*F16H 61/682* (2006.01)
*B63H 21/21* (2006.01)
(Continued)

(52) U.S. Cl.
CPC ......... *F16H 61/682* (2013.01); *B63H 21/213* (2013.01); *B63H 23/02* (2013.01);
(Continued)

(58) Field of Classification Search
None
See application file for complete search history.

(56) References Cited

U.S. PATENT DOCUMENTS

| | | | | |
|---|---|---|---|---|
| 4,649,708 A | * | 3/1987 | Fisher | F01B 21/00 60/700 |
| 5,245,893 A | * | 9/1993 | Koenig | F16H 61/0213 477/120 |

(Continued)

FOREIGN PATENT DOCUMENTS

| | | |
|---|---|---|
| EP | 2031280 B1 | 5/2019 |
| KR | 20160071933 A | 6/2016 |

(Continued)

*Primary Examiner* — S. Joseph Morano
*Assistant Examiner* — Jovon E Hayes
(74) *Attorney, Agent, or Firm* — Andrus Intellectual Property Law, LLP

(57) ABSTRACT

A method for shifting a marine propulsion device transmission between first and second gears transmitting torque from a powerhead with a redline RPM. The transmission has a transition time for completing a shift. The method includes measuring an RPM of the powerhead, comparing the RPM to a first threshold, and starting a timer when the RPM exceeds the first threshold. The method includes measuring the RPM of the powerhead after the first threshold is exceeded, comparing the RPM to a second threshold, stopping the timer when the RPM exceeds the second threshold, determining an elapsed time between starting and stopping the timer, and determining a shift RPM based on the determined elapsed time, the redline RPM, and the transition time of the transmission. The method includes controlling the transmission to shift when the RPM measured for the powerhead reaches the shift RPM such that shifting completes before the redline RPM.

20 Claims, 21 Drawing Sheets

(51) Int. Cl.
    *B63H 23/02* (2006.01)
    *B63H 23/06* (2006.01)
    *F16H 59/40* (2006.01)
    *F16H 59/74* (2006.01)
    *F16H 61/12* (2010.01)
    *F16H 61/16* (2006.01)
    *F16H 61/684* (2006.01)

(52) U.S. Cl.
    CPC ............. *B63H 23/06* (2013.01); *F16H 59/40* (2013.01); *F16H 59/74* (2013.01); *F16H 61/12* (2013.01); *F16H 61/16* (2013.01); *F16H 61/684* (2013.01); *B63H 2023/0258* (2013.01); *F16H 2059/743* (2013.01); *F16H 2306/40* (2013.01)

(56) References Cited

U.S. PATENT DOCUMENTS

| | | | |
|---|---|---|---|
| 5,517,410 A * | 5/1996 | Nakagawa | F16H 61/0213 701/110 |
| 5,729,454 A * | 3/1998 | Amsallen | F16H 61/0213 477/109 |
| 6,067,495 A | 5/2000 | Fliearman et al. | |
| 6,085,139 A | 7/2000 | Nakauchi et al. | |
| 6,098,004 A | 8/2000 | Grytzelius et al. | |
| 6,200,177 B1 | 3/2001 | Scott et al. | |
| 6,295,498 B1 * | 9/2001 | Gleason | F16H 61/0213 477/121 |
| 6,478,715 B1 * | 11/2002 | Hunold | B63H 23/02 701/55 |
| 6,496,767 B1 | 12/2002 | Lorentz | |
| 6,641,501 B2 | 11/2003 | Kitajima et al. | |
| 6,830,532 B1 | 12/2004 | Gebby et al. | |
| 7,194,348 B2 * | 3/2007 | Wada | F16H 3/64 701/55 |
| 7,330,782 B2 * | 2/2008 | Graham | B63H 21/22 701/21 |
| 7,470,212 B2 | 12/2008 | Inagaki | |
| 8,133,154 B2 | 3/2012 | Tao et al. | |
| 10,766,592 B1 * | 9/2020 | Przybyl | F16H 61/68 |
| 2008/0119327 A1 * | 5/2008 | Kitaori | F16H 61/0213 701/53 |
| 2009/0105914 A1 * | 4/2009 | Buur | B60K 6/445 701/55 |
| 2009/0209144 A1 | 8/2009 | Suzuki | |
| 2009/0215329 A1 * | 8/2009 | Suzuki | B63H 23/08 440/1 |
| 2009/0215334 A1 * | 8/2009 | Suzuki | B63H 23/30 440/85 |
| 2009/0263337 A1 | 10/2009 | Sengupta et al. | |
| 2009/0312926 A1 * | 12/2009 | MacFarlane | B60W 10/06 701/59 |
| 2010/0280684 A1 * | 11/2010 | Garon | F02D 41/2464 701/21 |
| 2010/0305822 A1 * | 12/2010 | Kresse | F16H 61/0213 701/56 |
| 2013/0109255 A1 * | 5/2013 | Agemura | B63H 21/21 440/1 |
| 2014/0336886 A1 * | 11/2014 | Rayala | B60W 10/11 701/53 |
| 2015/0377349 A1 | 12/2015 | Kosaka | |
| 2016/0223081 A1 * | 8/2016 | Inoue | F16H 37/021 |
| 2021/0370908 A1 * | 12/2021 | Hawley | B60L 58/15 |
| 2022/0252148 A1 * | 8/2022 | Poirier | F16H 61/684 |
| 2022/0252153 A1 * | 8/2022 | Snyder | F16H 61/682 |

FOREIGN PATENT DOCUMENTS

| | | |
|---|---|---|
| WO | 2014089394 A1 | 6/2014 |
| WO | 2019005654 A1 | 1/2019 |

\* cited by examiner

SYSTEMS AND METHODS FOR SHIFTING MULTI-SPEED TRANSMISSIONS

CROSS REFERENCE TO RELATED APPLICATION

This application claims the benefit of U.S. Provisional Patent Application No. 63/147,972, filed Feb. 10, 2021, which is incorporated herein by reference in its entirety.

FIELD

The present disclosure generally relates to shifting transmissions of marine propulsion devices, and more particularly to shifting multispeed transmissions.

BACKGROUND

The following U.S. Patents and Patent Applications provide background information and are incorporated by reference in entirety.

U.S. Pat. No. 5,711,742 discloses a marine propulsion system, preferably having dual counter rotating propellers, which has an automatic multi-speed shifting mechanism such as a transmission. An electronic controller monitors engine parameters such as engine revolution speed and load and generates a control signal in response thereto, which is used to control shifting. Engine load is preferably monitored by sensing engine manifold air pressure. The electronic controller preferably has a shift parameter matrix stored within a programmable memory for comparing engine speed and engine load data to generate the control signal. The system can also have a manual override switch to override shifting of the shifting mechanism.

U.S. Pat. No. 6,200,177 discloses a marine propulsion system which is provided with a gear shifting apparatus and method that changes a transmission from a low gear to a high gear, and vice versa, based solely on the engine speed. Engine speed is measured and a rate of change of engine speed is determined as a function of the actual change in engine speed over a measured time interval. Several threshold magnitudes are preselected and used to define one or more engine speed ranges. At least one threshold magnitude is used to compare the actual rate of change of engine speed to a preselected value. Both up shifting and down shifting of a transmission are controlled as a function of engine speed and rate of change of engine speed.

U.S. patent application Ser. No. 16/509,139 discloses a transmission for an outboard motor, the transmission having an input shaft with an input gear non-rotatably fixed thereto and rotatable by an engine. A countershaft has a countershaft driven gear and a reverse driving gear non-rotatably fixed thereto, where the countershaft driven gear meshes with the input gear. An output shaft has first and second driven gears non-rotatably fixed thereto. First and second driving gears mesh with the first and second driven gears, a reverse idler gear meshes with the reverse driving gear, and a reverse driven gear meshes with the reverse idler gear. First and second clutches selectively rotate the first and second driving gears with the countershaft in first and second modes at first and second speeds in forward rotation, respectively, and a reverse clutch selectively rotates the output shaft with the reverse driven gear in a reverse mode with reverse rotation.

U.S. patent application Ser. No. 16/512,643 discloses a transmission for an outboard motor, the transmission having an input shaft with an input gear. A countershaft has a countershaft driven gear and a reverse driving gear, where the countershaft driven gear meshes with the input gear. An output shaft has first and second driven gears. First and second driving gears mesh with the first and second driven gears. A reverse idler gear meshes with the reverse driving gear and also with a reverse driven gear. A plurality of clutches includes first, second, third, and reverse clutches. The first and second clutches selectively rotate the first and second driving gears with the countershaft in first and second modes in forward rotation, respectively. The third clutch selectively rotates the second driving gear with the input shaft in a third mode in forward rotation. The reverse clutch selectively rotates the output shaft with the reverse driven gear in reverse rotation.

U.S. patent application Ser. No. 16/733,825 discloses a method for synchronizing shifting of transmissions across marine propulsion devices. The method includes receiving a signal to shift the transmissions and identifying a predetermined shifting time for each of the transmissions, where the predetermined shifting time represents an elapsed time between starting the shifting and completing the shifting. The method further includes comparing the predetermined shifting times to determine a longest shifting time, calculating for each of the transmissions an offset time that is a difference between the corresponding predetermined shifting time and the longest shifting time, and sending a signal to start the shifting of each of the transmissions after waiting the offset time for that transmission such that the transmissions all complete the shifting at the same time.

U.S. Pat. No. 9,446,829 discloses a transmission for an outboard marine engine. The transmission comprises a rotatable input shaft that is rotated by an internal combustion engine, a rotatable output shaft that powers a propulsor, a forward gear that causes forward rotation of the output shaft and propulsor, a reverse mode that causes reverse rotation of the output shaft and propulsor, a clutch that is movable between a forward clutch position wherein the forward gear causes the forward rotation of the output shaft and propulsor and a reverse clutch position wherein the reverse mode causes the reverse rotation of the output shaft and propulsor, and an internal ring gear that couples the output shaft to one of the forward gear and the reverse mode.

U.S. Pat. No. 9,676,463 discloses a transmission for a marine propulsion device having an internal combustion engine that drives a propulsor for propelling a marine vessel in water. An input shaft is driven into rotation by the engine. An output shaft drives the propulsor into rotation. A forward planetary gearset that connects the input shaft to the output shaft so as to drive the output shaft into forward rotation. A reverse planetary gearset that connects the input shaft to the output shaft so as to drive the output shaft into reverse rotation. A forward brake engages the forward planetary gearset in a forward gear wherein the forward planetary gearset drives the output shaft into the forward rotation. A reverse brake engages the reverse planetary gearset in a reverse mode wherein the reverse planetary gearset drives the output shaft into the reverse rotation.

U.S. Pat. No. 9,718,529 discloses a marine transmission located within drive housing that includes a torque transmitting gear set and a clutch mechanism. The torque transmitting gear set includes top and bottom bevel gears and opposing side idler bevel gears mounted to a pinion shaft. The pinion shaft is mounted on a carrier and the clutch mechanism engages the carrier to rotate with the input shaft to drive the output shaft in the forward direction and engages the carrier to a reaction plate fixed to the drive housing to drive the output shaft in the reverse direction.

U.S. patent application Ser. No. 16/171,490 discloses an outboard motor having a powerhead that causes rotation of a driveshaft, a steering housing located below the powerhead, wherein the driveshaft extends from the powerhead into the steering housing; and a lower gearcase located below the steering housing and supporting a propeller shaft that is coupled to the driveshaft so that rotation of the driveshaft causes rotation of the propeller shaft. The lower gearcase is steerable about a steering axis with respect to the steering housing and powerhead.

U.S. Pat. No. 6,478,715 discloses a method for controlling at least one power-shift multi-speed boat transmission in conjunction with a fixed propeller or water jet, in which the upshift speed is a function of a value which indicates the intended acceleration, especially a function of the regulating speed of the control lever or the speed of modification of the transmission input speed.

U.S. Pat. No. 6,200,177 discloses a marine propulsion system which is provided with a gear shifting apparatus and method that changes a transmission from a low gear to a high gear, and vice versa, based solely on the engine speed. Engine speed is measured and a rate of change of engine speed is determined as a function of the actual change in engine speed over a measured time interval. Several threshold magnitudes are preselected and used to define one or more engine speed ranges. At least one threshold magnitude is used to compare the actual rate of change of engine speed to a preselected value. Both up shifting and down shifting of a transmission are controlled as a function of engine speed and rate of change of engine speed.

U.S. Pat. No. 10,322,786 discloses a method for controlling a marine engine's operating mode which includes operating the engine in an initial operating mode according to an initial set of mapped parameter values configured to achieve an initial fuel/air equivalence ratio of an air-fuel mixture for combustion. If measured operating conditions of the engine meet lean-burn mode enablement criteria, the engine is operated in lean-burn mode according to a lean-burn set of mapped parameter values configured to achieve a lean-burn fuel/air equivalence ratio that is less than the initial fuel/air equivalence ratio. If the measured engine operating conditions no longer meet the lean-burn mode enablement criteria, the engine is operated in the initial operating mode. Transitions between the lean-burn mode and the initial operating mode are monitored. If the transitions indicate that the engine's operating mode is unstable, the engine is prevented from operating in the lean-burn mode until after a reset condition has been met.

U.S. patent application Ser. No. 16/733,825 discloses a method for synchronizing shifting of transmissions across marine propulsion devices. The method includes receiving a signal to shift the transmissions and identifying a predetermined shifting time for each of the transmissions, where the predetermined shifting time represents an elapsed time between starting the shifting and completing the shifting. The method further includes comparing the predetermined shifting times to determine a longest shifting time, calculating for each of the transmissions an offset time that is a difference between the corresponding predetermined shifting time and the longest shifting time, and sending a signal to start the shifting of each of the transmissions after waiting the offset time for that transmission such that the transmissions all complete the shifting at the same time.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. patent application Ser. Nos. 15/714,244, 16/556,054, 17/087,035, 15/246,681, 15/377,510, 15/492,188, 62/799,427, 16/752,889, and 17/131,115 are also generally relevant and are discussed below.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one aspect of the present disclosure, there is a method for shifting a multi-speed transmission of a marine propulsion device between a first gear and a second gear each configured to transmit torque from a powerhead to a propulsor, where the powerhead has a redline RPM and the multi-speed transmission has a transition time for completing a shift. The method includes measuring an RPM of the powerhead and comparing the RPM to a first RPM threshold and starting a timer when the RPM exceeds the first RPM threshold, where the timer is reset when the RPM falls below the first RPM threshold. The method further includes measuring the RPM of the powerhead after the first RPM threshold is exceeded and comparing the RPM to a second RPM threshold that is different than the first RPM threshold. The method further includes stopping the timer when the RPM exceeds the second RPM threshold and determining an elapsed time between starting and stopping the timer and determining a shift RPM based on the determined elapsed time, the redline RPM of the powerhead, and the transition time of the multi-speed transmission. The method further includes controlling the multi-speed transmission to shift when the RPM measured for the powerhead reaches the shift RPM such that the shifting completes before the RPM of the powerhead reaches the redline RPM.

According to another aspect, there is provided a marine propulsion device including a powerhead configured to generate torque for rotating a propulsor. The powerhead has a redline RPM. A multi-speed transmission has a first gear and a second gear selectively engageable to transmit the torque from the powerhead to the propulsor. The multi-speed transmission has a transition time for completing a shift between the first gear and the second gear. A sensor is operatively coupled to measure an RPM of the powerhead. A control system is operatively coupled to the multi-speed transmission and to the sensor. The control system is configured to receive the RPM of the powerhead, compare the RPM to a first RPM threshold, and start a timer when the RPM exceeds the first RPM threshold, where the timer is reset when the RPM falls below the first RPM threshold. The control system is further configured to receive the RPM of the powerhead after the first RPM threshold is exceeded and compare the RPM to a second RPM threshold that is different than the first RPM threshold. The control system is further configured to stop the timer when the RPM exceeds the second RPM threshold and determine an elapsed time between starting and stopping the timer and to determine a shift RPM based on the determined elapsed time, the redline RPM of the powerhead, and the transition time of the multi-speed transmission. The control system is further configured to cause the multi-speed transmission to shift when the RPM measured for the powerhead reaches the shift RPM such that the shifting completes before the RPM of the powerhead reaches the redline RPM.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

Figure 1:
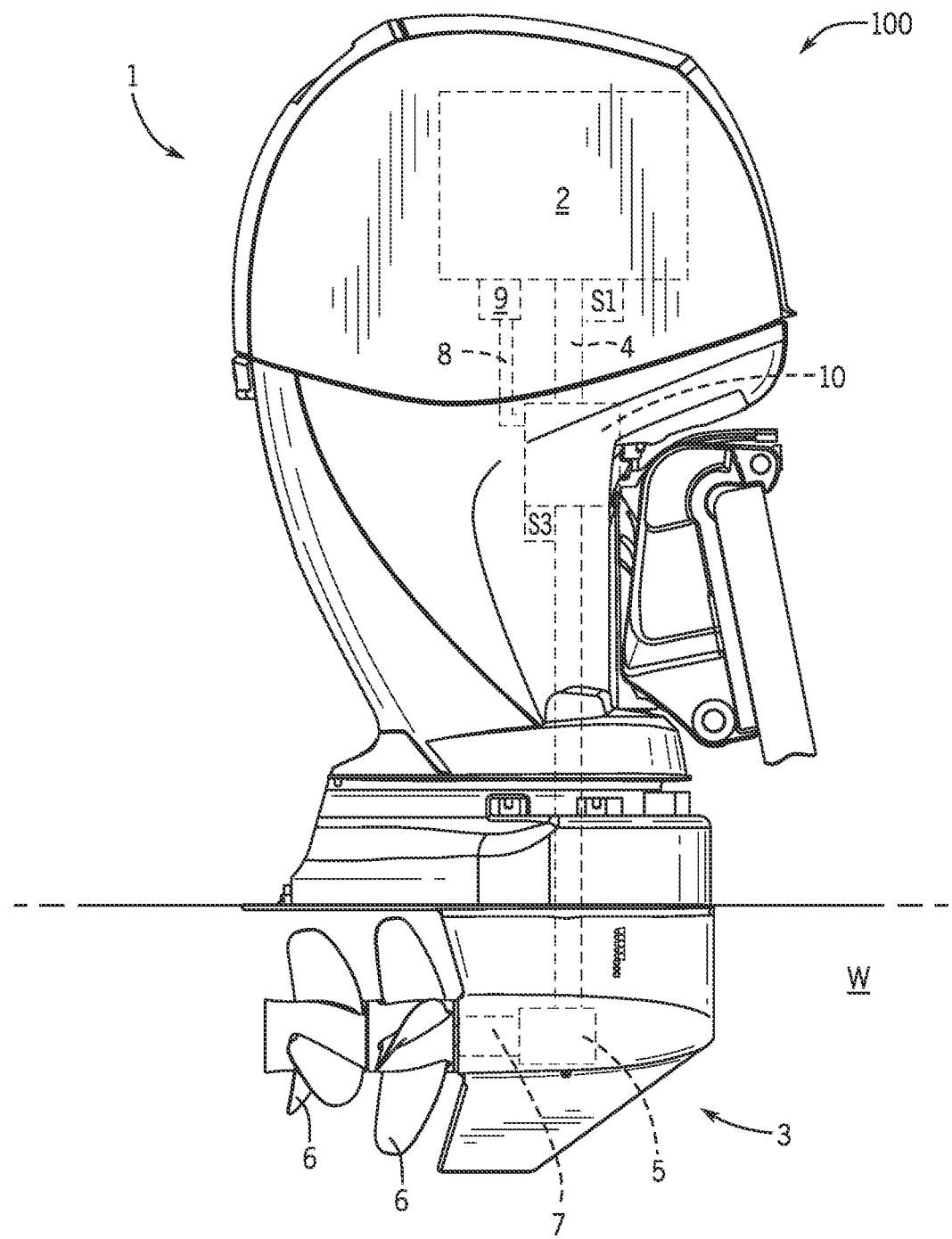
FIG. 1 is a side view of an exemplary marine propulsion device incorporating a multi-speed transmission shiftable according to the present disclosure.

The present disclosure generally relates to multi-speed transmissions (i.e., transmissions having more than one forward gear), and particularly those used with marine propulsion devices. FIG. 1 depicts an exemplary marine propulsion device 1 incorporating a system 100 for shifting one or more multi-speed transmissions according to the present disclosure. The marine propulsion device 1 includes a powerhead 2 configured to rotate a driveshaft 4, which through a transmission 10 (discussed below), as well as propeller shaft gearsets 5 and propeller shafts 7 contained within a gearcase 3 are operational to rotate one or more propellers 6 to propel a vessel through the water W in a manner known in the art. Exemplary powerheads 2 include electric motors, internal combustion engines (e.g., gasoline or diesel engines), hybrids, or combinations thereof.

The transmission 10 is operable via a clutch actuator 8, which is controlled by a controller 9 to effectuate shifting within the transmission 10. As discussed below, the controller 9 may be the control system 200 of FIG. 4. For simplicity, a single clutch actuator 8 is referenced for controlling all clutches in the transmission 10, though it should be recognized that multiple individual clutch actuators may be used in practice. In the examples provided below, the clutches are hydraulically operated, whereby an electrical current provided by the controller 9 to the clutch actuator 8 causes the pressure of a fluid within a given clutch to increase until eventually causing that clutch to engage in a manner known in the art. The present disclosure also contemplates other types of clutch actuators 8, which may be actuated pneumatically and/or electromechanically.

Additional information regarding transmissions can be found in SAE International's "Design Practices: Passenger Car Automatic Transmissions" (Fourth Edition, Product Code AE-29, 2012) and SAE International's "Dynamic Analysis and Control System Design of Automatic Transmissions" (2013), which are each incorporated by reference herein. While the present disclosure focuses primarily on two-speed transmissions, it should be recognized transmissions having more speeds are equally applicable.

Figure 2:
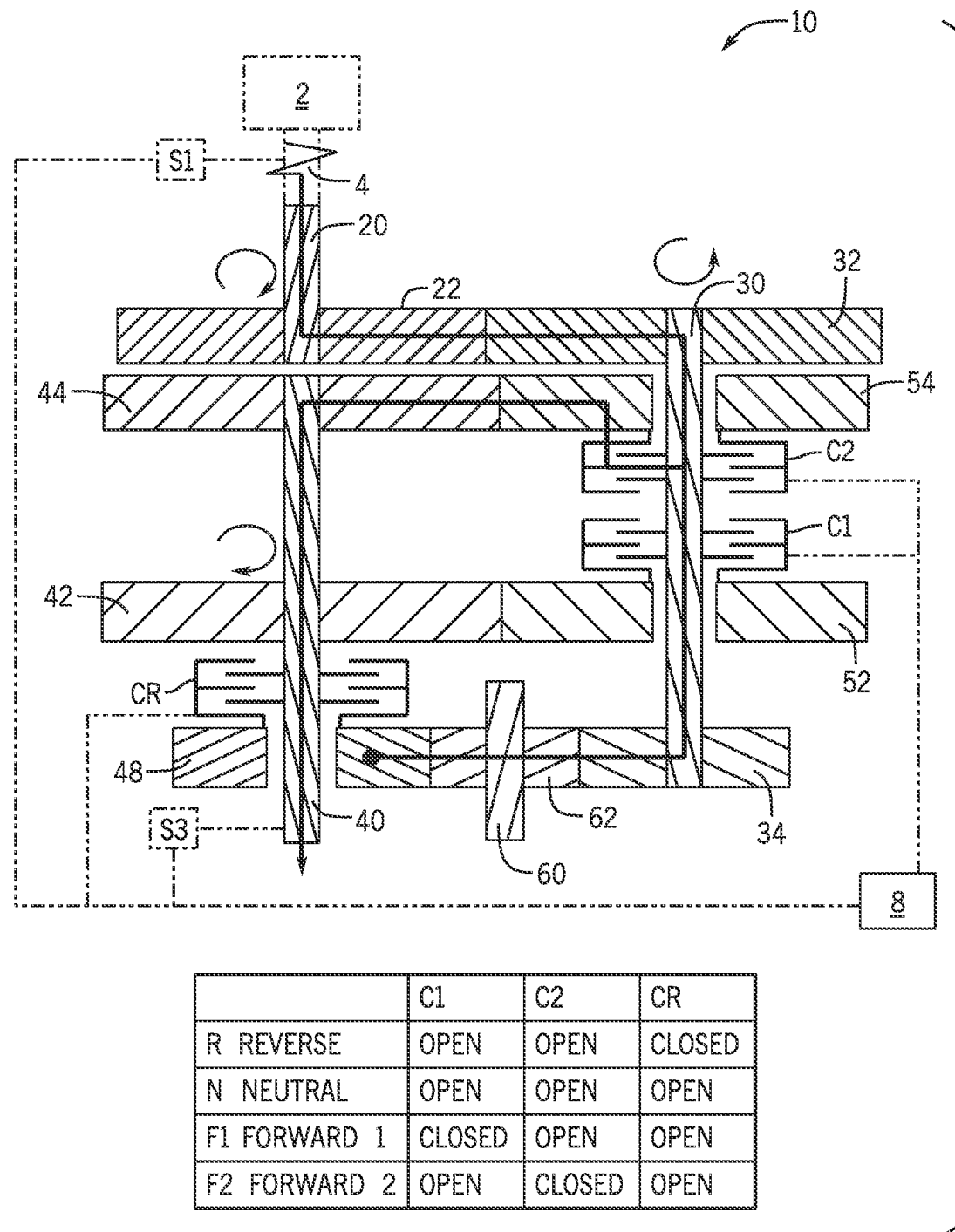
FIG. 2 is a schematic view of an exemplary multi-speed transmission having two forward speeds and being shiftable according to the present disclosure.

FIG. 2 depicts an embodiment of a multi-speed transmission according to the present disclosure, here a transmission 10 having first and second gears corresponding to two forward gears. The transmission 10 has an input shaft 20 that is configured to be coupled to the driveshaft 4 rotated by the powerhead 2. In this manner, the input shaft 20 is caused to rotate whenever the powerhead 2 is operating. While the input shaft 20 is shown here to be physically connected to the driveshaft 4, it should be recognized that the transmission 10 may be positioned anywhere between the driveshaft 4 and the propeller 6 to translate rotatable power therebetween. A powerhead speed sensor (labelled as S1) is operatively coupled to the driveshaft 4 to detect a rotational speed (also referred to as an RPM) of the driveshaft 4 in a manner known in the art. A transmission output shaft speed sensor (labelled as S3) measures the RPM of the transmission output shaft 40. In certain embodiments, the transmission output shaft speed sensor S3 measures the speed of one of the gears engaged to rotate therewith (for example, second driving gear 54, discussed further below), which is proportional to the rotational speed of the transmission output shaft 40 and thus can be used to determine the RPM of the transmission output shaft 40.

With continued reference to FIG. 2, the input shaft 20 of the transmission 10 has an input gear 22 that is non-rotatably fixed thereto such that the input gear 22 and input shaft 20 rotate together. The input gear 22 meshes with a countershaft driven gear 32, which is non-rotatably fixed to a countershaft 30. In this manner, the input shaft 20 and the countershaft 30 are configured to rotate in opposite directions. A reverse driving gear 34 is also non-rotatably fixed to the countershaft 30 such that the reverse driving gear 34 also rotates in a direction opposite of the input shaft 20. In the embodiment shown, the countershaft 30 is parallel to the input shaft 20.

The transmission 10 further includes an output shaft 40 having a first driven gear 42 and also a second driven gear 44 that are each non-rotatably fixed to the output shaft 40. The first driven gear 42 meshes with a first driving gear 52 that is selectively engageable with the countershaft 30 via engagement of a first clutch C1. Similarly, the second driven gear 44 meshes with a second driving gear 54 that, similarly to the first driving gear 52, is selectively engageable with the countershaft 30 via a second clutch C2. When the first clutch C1 is engaged, the first driving gear 52 is caused to rotate by the countershaft 30. Similarly, when the second clutch C2 is engaged, the second driving gear 54 is caused to rotate by the countershaft 30.

With continued reference to FIG. 2, the first clutch C1 and second clutch C2 may be selectively engaged or actuated via the clutch actuator 8. As discussed above, the clutch actuator 8 may be further operated using a controller 9 (FIG. 1), such as to provide automatic shifting, and thus automatic actuation of the clutches.

The transmission 10 includes a reverse idler gear 62 that is supported by and rotates with a reverse idler shaft 60. The reverse idler gear 62 meshes with the reverse driving gear 34 coupled to the countershaft 30 so as to rotate therewith. The reverse idler gear 62 further meshes with a reverse driven gear 48 that is selectively engageable with the output shaft 40 by engagement via a reverse clutch CR. The reverse clutch CR is also operable through use of the clutch actuator 8 in the manner previously described for the first clutch C1 and second clutch C2.

In this manner, the first clutch C1 selectively rotates the first driving gear 52 with the countershaft 30, the second clutch C2 selectively rotates the second driving gear 54 with the countershaft 30, and the reverse clutch CR selectively rotates the output shaft 40 with the reverse driven gear 48. By selectively engaging the first clutch C1, second clutch C2, and/or reverse clutch CR, the transmission 10 is shiftable between a first gear (also referred to as first gear F1) in which the output shaft 40 rotates in a forward direction at a first speed relative to a speed of the input shaft 20, a second gear (also referred to as second gear F2) with rotation of the output shaft 40 in the forward direction at a second speed relative to the speed of the input shaft 20 that is different than the first speed, and also a reverse mode (also referred to as reverse gear R) in which the output shaft 40 rotates in reverse rotation that is opposite of the forward direction (i.e., opposite the input shaft 20). The transmission 10 also has a neutral mode (also referred to as neutral N) in which rotation of the input shaft 20 does not cause rotation of the output shaft 40.

The following are examples of components that may be used in present or altered form for the presently disclosed systems and methods: Multidisc clutch packs presently used in outboard engines, such as in Mercury Marine's Zeus 3000 transmission part number 879148T69 or Mercury's ZF transmission part number ZF 105 S; a controller such as Mercury TVM part number 8M0079409 (also used with the Zeus 3000 transmission), and solenoid valves such as Bosch DRE05SK. Other examples may also be taken from existing Mercury or other marine propulsion devices and/or are also be known in the art.

FIG. 2 further incorporates a table showing the combination of engaged and disengaged clutches corresponding to each of the modes for operating the transmission 10. In first gear F1, only the first clutch C1 is closed, or in other words, the second clutch C2 and the reverse clutch CR are open. Similarly, in second gear F2, only the second clutch C2 is closed, with the first clutch C1 and the reverse clutch CR being open. The transmission 10 is in reverse mode R when only the reverse clutch CR is engaged, and in neutral N when none of the clutches are engaged.

It should be recognized that the difference in the gear ratio between the first driving gear 52 and first driven gear 42, as compared to between the second driving gear 54 and the second driven gear 44, dictates the rotational speed of the output shaft 40 relative to the input shaft 20.

Other configurations of multi-speed transmissions are also contemplated by the present disclosure, including those have more than two forward gears. For simplicity, the present disclosure will generally describe a configuration in which the second clutch C2 alone is engaged for the second gear F2.

Figure 3:
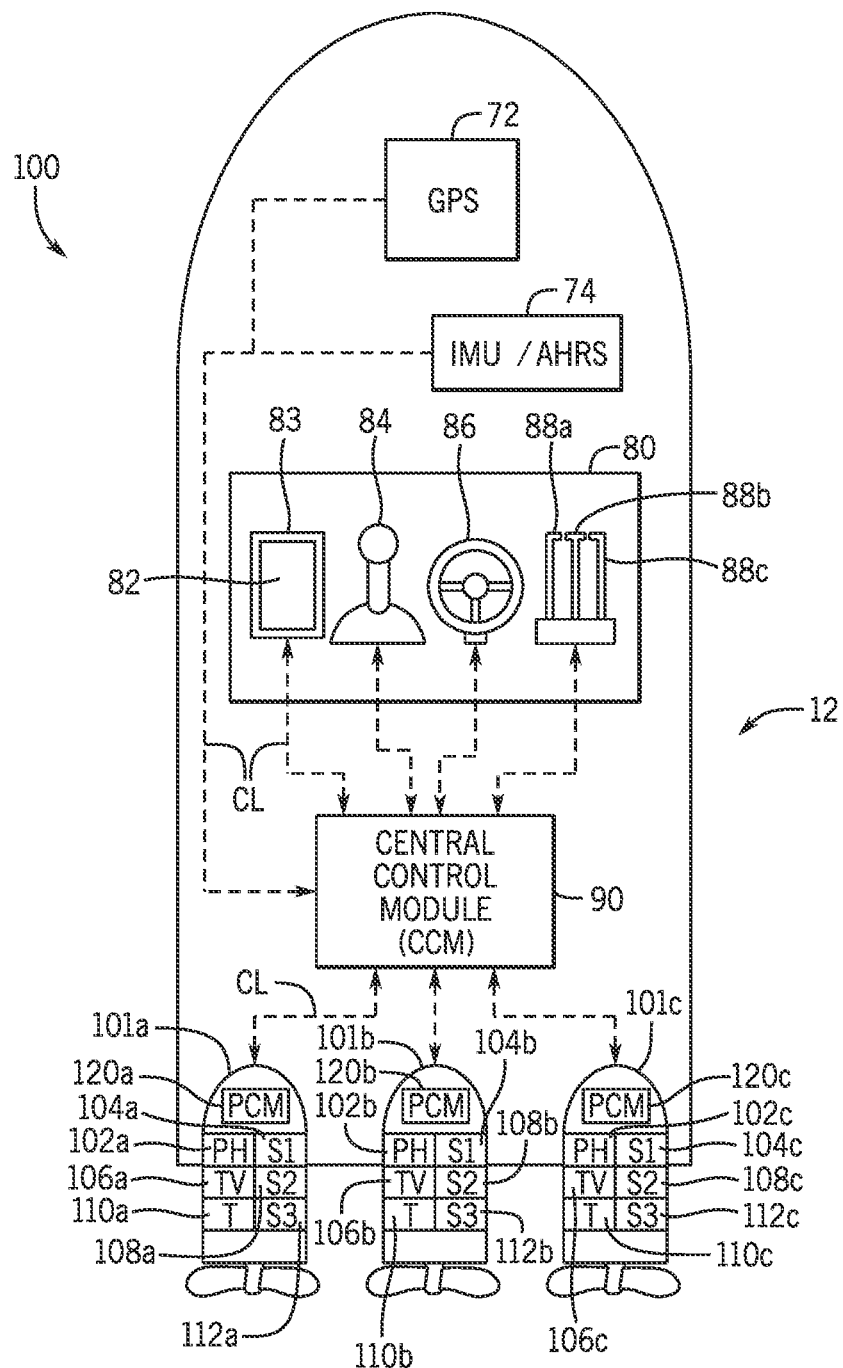
FIG. 3 is a top view of an exemplary marine vessel incorporating a system for shifting multi-speed transmissions for three marine propulsion devices according to the present disclosure.
Figure 4:
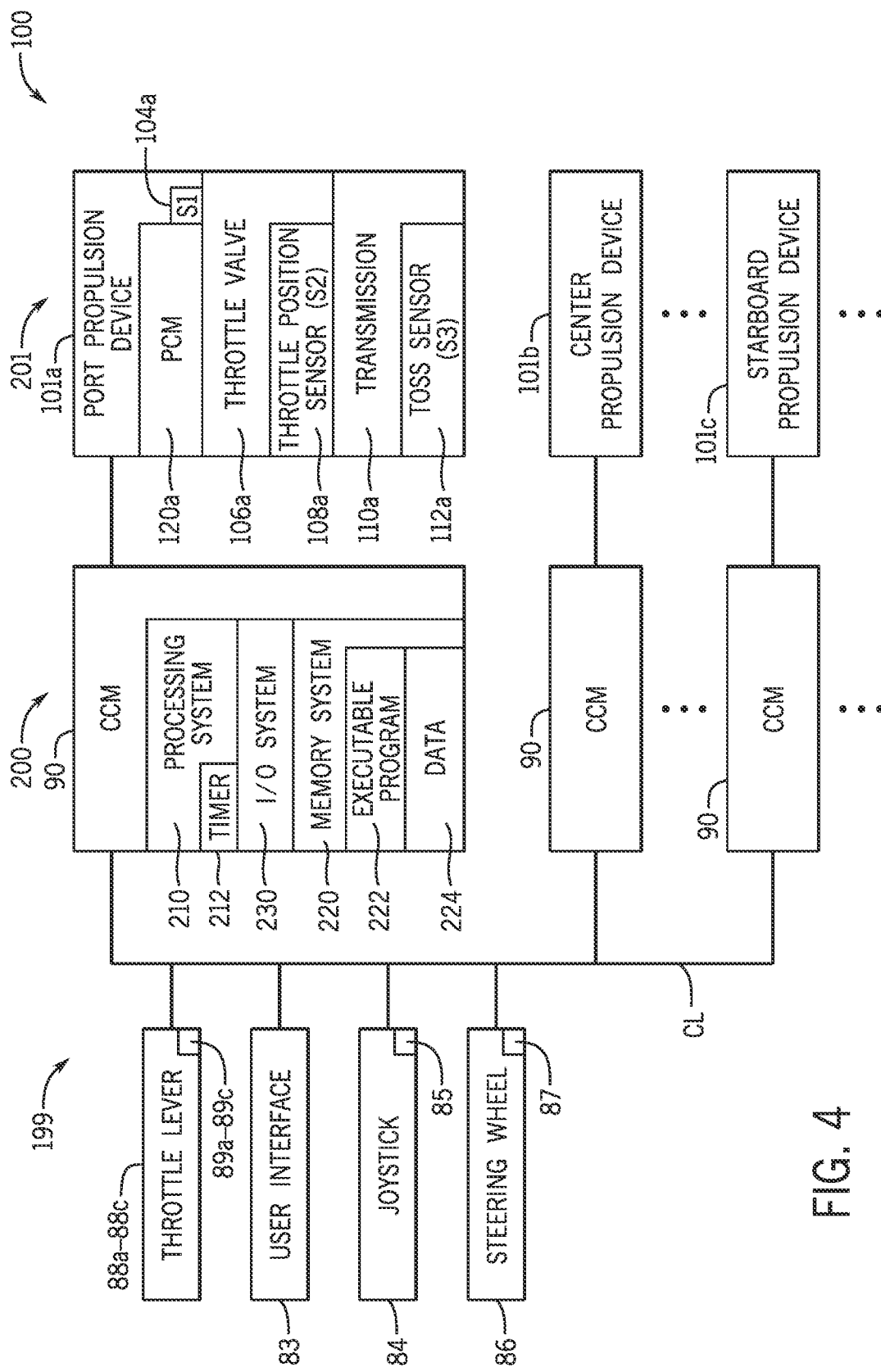
FIG. 4 is schematic view of a control system such as may be incorporated within the system of FIG. 3.

FIGS. 3-4 depict a marine vessel 12 and corresponding system 100 for shifting multi-speed transmissions according to the present disclosure, in this example for three marine propulsion devices 101a-101c. For clarity, the marine propulsion devices 101a-101c and components thereof are in some cases renumbered from the equivalent example of FIG. 1 when referred to separately across multiple marine propulsion devices.

The marine vessel 12 includes various operator input devices located at a helm 80, through which the user controls operation of the marine vessel 12 and components thereof. The operator input devices are operable to control, among other things, the speed and direction of the marine vessel 12 in manners known in the art. The exemplary operator input devices shown include a multi-functional display device 83 including a user interface 82. The user interface 82 may be an interactive, touch-capable display screen, a keypad, a display screen and keypad combination, a track ball and display screen combination, or any other type of user interface known to those having ordinary skill in the art for communicating with a multi-functional display device 83.

The embodiment of FIGS. 3-4 includes a joystick 84 provided at the helm 80 that allows an operator of the marine vessel 12 to command the marine vessel 12 to translate or rotate in any number of directions. A steering wheel 86 is also provided for providing steering commands to the marine propulsion devices 101a-101c based on a wheel position detected by a position sensor 87. In certain systems presently known in the art, the steering wheel 86 or other steering device (e.g., the joystick 84) transmits a steering percentage to a central control module 90 to steer the marine propulsion devices 101a-101c based on the location of the steering device relative to its centered position. The steering percentage may be detected by a sensor 85 or sensor 87 associated with the joystick 84 or steering wheel 86, respectively, in a manner known in the art (see FIG. 4). Accordingly, this value transmitted from the steering device 82, 84, 86 can be defined as being between −100 percent and +100 percent corresponding the steering all the way to port and all the way to starboard, respectively.

Throttle controls 88a-88c are also provided at the helm 80, which provide thrust commands as both a magnitude and a direction of thrust for each the marine propulsion devices 101a-101c, respectively, based on lever positions detected by a corresponding throttle position sensors 89a-89c. However, it should be recognized that a single lever could also be provided for controlling all marine propulsion devices 101a-101c. By way of example, a rotation of one of the throttle controls 88a-88c in a forward direction away from its neutral, detent position could be interpreted as a value from 0% to 100% operator demand corresponding via an input/output map, such as a look up table, to a position of the throttle valves 106a-106c of the powerheads 102a-102c, respectively.

For example, the input/output map might dictate that the throttle valves 106a-106c are fully closed when the throttle control 88a-88c is in the central, detent position (i.e., 0% demand), and are fully open when the throttle control 88a-88c is pushed forward to its furthest extent (i.e., 100% demand). Throttle valve position sensors 108a-108c measure the positions of these throttle valves 106a-106c in a manner known in the art. As discussed further below, similar methods may also be employed for controlling steering, whereby operator inputs are received (e.g., from the steering wheel 86) from a range of −100% to +100% corresponding to full port and full starboard steering directions, which then cause corresponding steering of the marine propulsion devices 101a-101c, in certain examples through the use of a lookup table.

In addition to the inputs provided at the helm 80, the marine vessel 12 also includes a global positioning system (GPS) 72 that provides a location and a speed of the marine vessel 12. Additionally, or alternatively, a vessel speed sensor such as a Pitot tube or a paddle wheel could be provided. The marine vessel 12 may also include an inertial measurement unit (IMU) or an attitude and heading reference system (AHRS) 74. An IMU has a solid state, rate gyro electronic compass that indicates the vessel heading and solid-state accelerometers and angular rate sensors that sense the vessel's attitude and rate of turn. An AHRS provides 3D orientation of the marine vessel 12 by integrating gyroscopic measurements, accelerometer data, and magnetometer data. The IMU/AHRS could be GPS-enabled, in which case a separate GPS 72 would not be required.

The marine propulsion devices 101a-101c of FIG. 3 are shown as outboard motors. However, the marine propulsion devices could also or alternatively be inboard motors, stern drives, pod drives, outboard motors having steerable gear cases (as discussed in U.S. patent Ser. No. 16/171,490, for example) and/or jet drives, for example. Each marine propulsion device 101a-101c includes a powerhead 102a-102c as described above for the powerhead 2 of FIG. 1. Powerhead speed sensors (labelled as S1) 104a-104c measure the rotational speeds of the driveshafts for each respective powerhead 102a-102c. In one example, the powerhead speed sensors 104a-104c are shaft rotational speed sensors (e.g., Hall-Effect sensors) that measure a speed of the powerhead 102a-102c (or its driveshaft 4) in rotations per minute (RPM), as is known to those having ordinary skill in the art. Similar sensors as known in the art may be used as transmission output shaft speed sensors (labelled as S3) 112a-112c that measure the RPM of the transmission output shaft 40 (see FIG. 2) for each of the transmissions 110a-110c, which are configured like the transmission 10 of FIG. 2. The transmission output shaft speed is also referred to as TOSS. Throttle valve position sensors 108a-108c (labelled as S2) are also included, which measure the position of the throttle valves 106a-106c in a manner known in the art.

With reference to FIGS. 3 and 4, the system 100 includes a control system 200 that communicates with input devices 199 from various components, such as position sensors 85, 87 that detect the positions of the joystick 84 and/or steering wheel 86, respectively, for example. Additional input devices 199 include the throttle valve position sensors 108a-108c and/or user interface 82, for example by setting a route or destination using the GPS 72. The control system 200 also communicates with output devices 201, such as propulsion control modules (PCMs) 120a-120c that control the marine propulsion devices 101a-101c, as well as corresponding steering actuators and trim actuators as known in the art, for example. Exemplary steering actuators and sensors are disclosed in U.S. Pat. Nos. 7,150,664; 7,255,616; and 7,467,595, which are incorporated by reference herein. Exemplary trim actuators and sensors are disclosed in U.S. Pat. Nos. 6,583,728; 7,156,709; 7,416,456; and 9,359,057, which are incorporated by reference herein. Sensors may also be provided for determining the actual steering and trim positions of each marine propulsion device 101a-101c in a manner known in the art.

It should be recognized that the arrows and lines shown in FIGS. 3 and 4 are merely exemplary and that communication may flow in multiple directions. For example, marine propulsion devices 101a-101c may communicate directly with each other, through one or more central command modules 90, or combinations thereof.

The system 100 of FIG. 3 includes a single central control module 90 (or CCM) in signal communication with all marine propulsion devices 101a-101c, as well as with the associated sensors and components corresponding thereto. In certain examples, the central control module 90 communicates with propulsion control modules 120a-120c (or PCMs) and/or other control devices associated with each of the marine propulsion devices 101a-101c in a manner known in the art. Although FIG. 3 shows one central control module 90, it should be recognized that more than one central control module may work together serially and/or in parallel, such as one central control module 90 for each of the marine propulsion devices 101a-101c (as shown in FIG. 4). Furthermore, portions of the method disclosed herein below can be carried out by a single central control module or by several separate control modules communicatively connected and cooperating to operate the marine propulsion devices 101a-101c, including shifting of transmissions 110a-110c thereof. For example, the one or more central control module 90 may be communicatively connected to a propulsion control module 120a-120c associated with each of the marine propulsion devices 101a-101c.

FIG. 4 illustrates various subsystems within an exemplary central control module 90, such as that shown in FIG. 3. A person of ordinary skill in the art will recognize that these subsystems may be duplicated or divided across additional central control modules 90 (as applicable), and/or across other control modules, such as propulsion control modules 120a-120c or other controllers within the marine vessel 12. In the example shown, the central control module 90 includes a processing system 210, which may be implemented as a single microprocessor or other circuitry, or be distributed across multiple processing devices or sub-systems that cooperate to execute the executable program 222 from the memory system 220. A timer 212 is also provided, shown here in conjunction with the processing system 210, which is configured to count an elapsed time between starting and stopping of the timer 212, for example. Non-limiting examples of the processing system include general purpose central processing units, application specific processors, and logic devices. In the example shown, three central control modules 90, each associated with a marine propulsion device 101a-101c, together comprise a control system 200. However, as discussed above, the propulsion control modules 120a-120c and/or other controllers in alternate configurations may also be considered to be part of the control system 200.

The central control module 90 further includes a memory system 220, which may comprise any storage media readable by the processing system 210 and capable of storing the executable program 222 and/or data 224. The memory system 220 may be implemented as a single storage device, or be distributed across multiple storage devices or sub-systems that cooperate to store computer readable instructions, data structures, program modules, or other data. The memory system 220 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. An input/output (I/O) system 230 provides communication between the control system 200 and peripheral devices, such as input devices 199 and output devices 201, which are discussed further below. In practice, the processing system 210 loads and executes an executable program 222 from the memory system 220, accesses data 224 stored within the memory system 220, and directs the system 100 to operate as disclosed herein.

A person of ordinary skill in the art will recognize that these subsystems within the control system 200 may be implemented in hardware and/or software that carries out a programmed set of instructions. As used herein, the term "central control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A central control module may include memory (shared, dedicated, or group) that stores code executed by the processing system. The term "code" may include software, firmware, and/or microcode, and may refer to programs, routines, functions, classes, and/or objects. The term "shared" means that some or all code from multiple central control modules may be executed using a single (shared) processor. In addition, some or all code from multiple central control modules may be stored by a single (shared) memory. The term "group" means that some or all code from a single central control module may be executed using a group of processors. In addition, some or all code from a single central control module may be stored using a group of memories. As shown in FIG. 4, one or more central control module 90 may together constitute a control system 200 within the presently disclosed system 100. The one or more central control modules 90 can be located anywhere on the marine vessel 12.

A person of ordinary skill in the art will understand in light of the disclosure that the control system 200 may include a differing set of one or more control modules, or control devices, which may include engine control modules (ECMs) for each marine propulsion device 101a-101c (which will be referred to as ECMs even if the marine propulsion device 101a 101c contains an electric motor in addition to or in place of an internal combustion engine), one or more thrust vector control modules (TVMs), one or more helm control modules (HCMs), and/or the like. Likewise, certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices.

The control system 200 communicates with each of the one or more components of the marine vessel 12 via a communication link CL, which can be any wired or wireless link. The illustrated communication link CL connections between functional and logical block components are merely exemplary, which may be direct or indirect, and may follow alternate pathways. Additional and/or alternate communication links CL may be provided, for example directly between marine propulsion devices 101a-101c. The control system 200 is capable of receiving information and/or controlling one or more operational characteristics of the marine vessel 12 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the marine vessel 12. Moreover, the communication link CL lines are meant only to demonstrate that the various control elements are capable of communicating with one another, and do not represent actual wiring connections between the various elements, nor do they represent the only paths of communication between the elements. Additionally, the marine vessel 12 may incorporate various types of communication devices and systems, and thus the illustrated communication links CL may in fact represent various different types of wireless and/or wired data communication systems.

With the introduction of a multi-speed transmission comes the need for selecting a desired gear for operation at any given point in time. The present inventors have experimented with using different RPM thresholds for the powerhead for determining when to upshift or downshift between first gear F1 and second gear F2 of the transmission. In certain existing systems, when the RPM of the powerhead is greater than a first threshold, the transmission will be shifted into the second gear F2. Likewise, when the RPM drops below a second threshold, the transmission will shift to first gear F1. However, through experimentation and development, the present inventors have recognized that a shifting schedule providing shifting only through this two RPM threshold technique was not well-suited for application across different boat types. Likewise, this method could not be sufficiently calibrated to handle the differences between fast and slow speed requests from the helm.

One technique presently known in the art is described in U.S. Pat. No. 6,478,715. This patent describes using a 2D map ordinated with a percentage of the maximum engine RPM versus the throttle lever position at the helm to together determine a desired gear. The present inventors have identified that tables are particularly advantageous over a map as being simpler to implement in software, simpler to calibrate, and using fewer resources in the control system 200 (e.g., memory system 220). Another method known in the art is described in U.S. Pat. No. 6,200,177, which uses an RPM of the powerhead and a rate of change of this RPM to determine the desired gear.

Through experimentation and development, the present inventors have developed new systems and methods for determining when to shift gears in a multi-speed transmission, including the development and use of a multi-faceted shift control plan. As will be discussed below, the disclosed shift control plan provides for performance optimization, improved user experience, and also safeguards to protect the marine propulsion device. For example, certain embodiments of shift control plan include consideration of the redline RPM. Other components of the shift control plans disclosed herein include coordination shifting across multiple marine propulsion devices and comparing the controlled power of a powerhead versus an actual, measured transmission output shaft speed (TOSS), for example. Subject to limitations, if the transmission is currently operating in a first gear F1, one or more of these individual facets or components (also referred to below as logic segments for execution) may cause the marine propulsion device to shift its transmission into second gear F2. Flow charts depicting exemplary logic for controlling shifting are provided and discussed below.

Many of the logic segments described below incorporate a measurement of the transmission output shaft speed or TOSS, which as discussed can be determined by transmission output shaft speed sensors (labelled as S3) 112a-112c (FIGS. 3-4). The TOSS is proportional to propeller speed. The present inventors have recognized that it is advantageous to use TOSS as a measure of the output of a marine propulsion device, rather than the RPM of its powerhead. Specifically, the present inventors have determined that during a shift event from one gear to another, the RPM of the powerhead rapidly changes by the gear ratio. In contrast, the TOSS remains relatively constant through the shift. Moreover, the present inventors have also recognized that if powerhead speed or RPM is used to determine when to shift the transmission, the corresponding control logic would necessarily require a dead band to handle the change in RPM described above. In other words, the control logic would need to ignore large portions of the engine RPM data so as to not accidentally trigger actions by a given marine propulsion device during this rapid change, which would be counterproductive. Incorporating a dead band necessarily limits the ability of the calibrator to optimize the calibration, as portions of the data set would need to be ignored. The present inventors have identified that this need for a dead band is yet another disadvantage of systems relying on a map for determining when to shift.

In view of the problems and challenges outlined above, the present inventors have determined that TOSS is a much more suitable input signal for its improved stability and for being highly correlated to boat speed, which is desirable to use when determining shifting points for a transmission. Another advantage is that using TOSS in the manner disclosed herein allows the use of the same calibration on many different vessels, irrespective of having differing weights, differing acceleration profiles, and/or the like. It should be recognized that other signals correlated to speed may also be used, such as the speed of the marine vessel according to the GPS or pitot tube.

The present inventors have recognized that the use of multiple inputs to determine the desired gear for a multi-speed transmission based on the current operating conditions greatly improves performance over systems and methods presently known in the art. Additionally, the present inventors have recognized that selecting the desired gear according to the present disclosure not only ensures sufficient thrust to dynamically operate the boat, but also minimizes fuel usage through optimization at each stage of use, for example getting under way versus planning, etc. Additionally, it is highly advantageous for a single calibration to be applicable across different vessels and different configurations, avoiding the need for reprogramming when a marine propulsion device is replaced, additional marine propulsion devices are added, or the mass or operating conditions of a marine vessel vary from typical usage.

Figure 5:
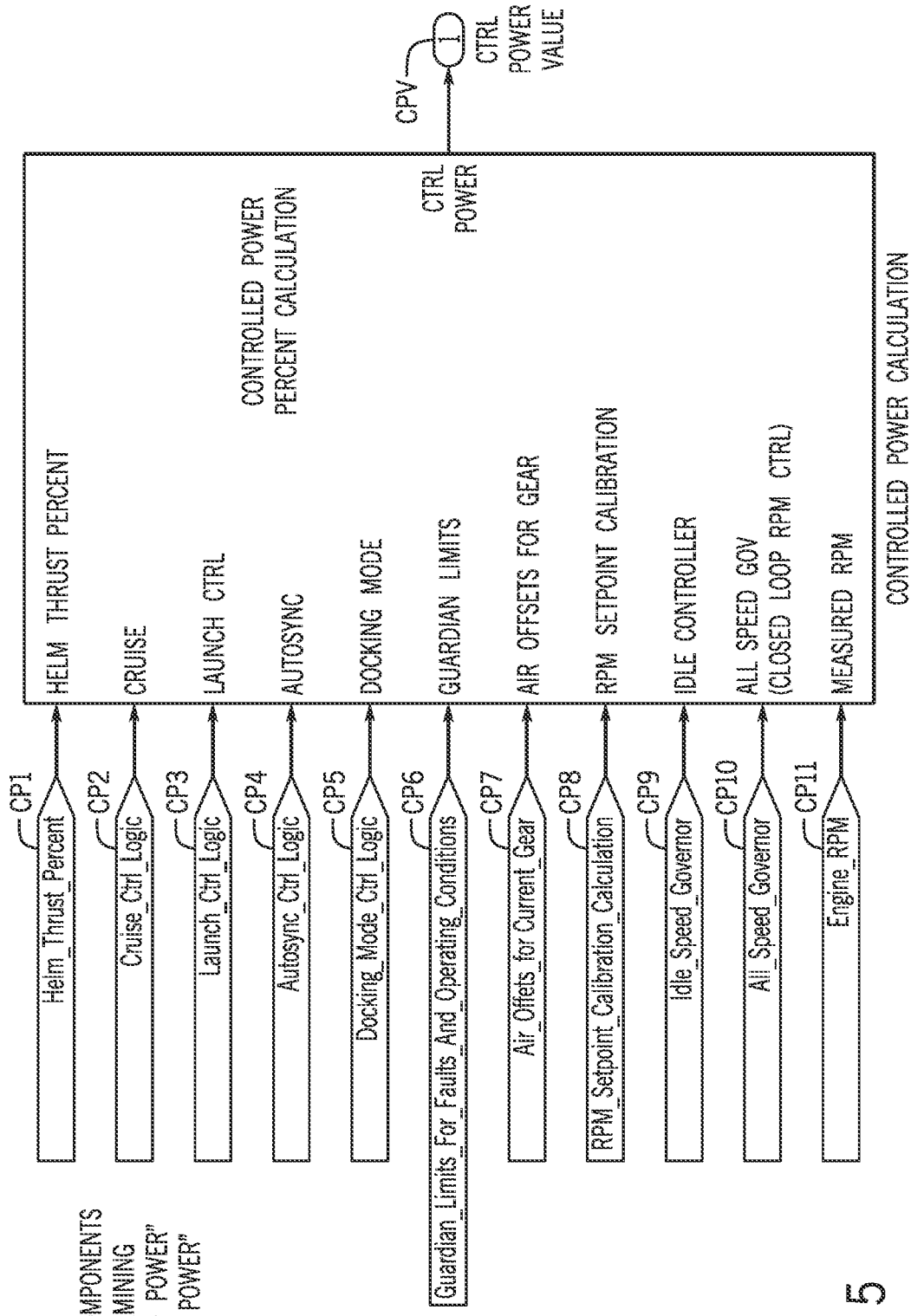
FIG. 5 is a schematic view of exemplary components for determining the "controlled power" as used in the system of FIG. 3 according to the present disclosure.

FIG. 5 depicts exemplary components for determining the "controlled power" of a marine propulsion device. In short, the controlled power is the normalized power output setpoint of a powerhead of a marine propulsion device. In certain embodiments, controlled power is the amount of output power an all speed governor has determined is needed to maintain the desired RPM and is calculated from a wide array of inputs. The all speed governor, which is used in systems presently known in the art, functions to maintain a constant speed for the marine vessel, for example by automatically increasing the power output of the powerhead when the marine vessel enters a turn. These exemplary components or inputs to controlled power are shown as CP1-CP11, which together are combined to calculate a controlled power value CPV for operating the marine propulsion device, and particularly its powerhead.

In the example shown, the controlled power value CPV accounts for the helm thrust percent CP1, which includes but is not limited to signals received from the throttle position sensors 89a-89c associated with the throttle controls 88a-88c. Other inputs included in the determination of controlled power value CPV include those from cruise control logic CP2 (e.g., a request to maintain a constant boat speed), launch control logic CP3 (which ramps up power at a user selectable rate to control the rate of boat acceleration, e.g. for tubing or water skiing, as described in U.S. patent application Ser. Nos. 15/714,244, 16/556,054, and 17/087,035), docking mode control logic CP5 for automatically or semi-automatically docking the marine vessel (as described in U.S. patent application Ser. Nos. 15/246,681, 15/377,510, 15/492,188, 62/799,427, 16/752,889), guardian limits CP6, which limits the output power of the engine to prevent engine damage or unsafe condition such as overheat or broken hardware (as described in U.S. patent application Ser. No. 17/131,115), to name a few. Other safeguards, performance optimizers, and/or the like are also provided. As discussed above, another component of controlled power is the all speed governor CP10 that ensures a constant speed of the vessel. In short, FIG. 5 depicts examples of the components that together establish the controlled power for operating the powerheads at any given point in time. As will be discussed below, this controlled power serves in certain circumstances as an input for controlling the shifting of one or more multi-speed transmissions according to the present disclosure.

Figure 6:
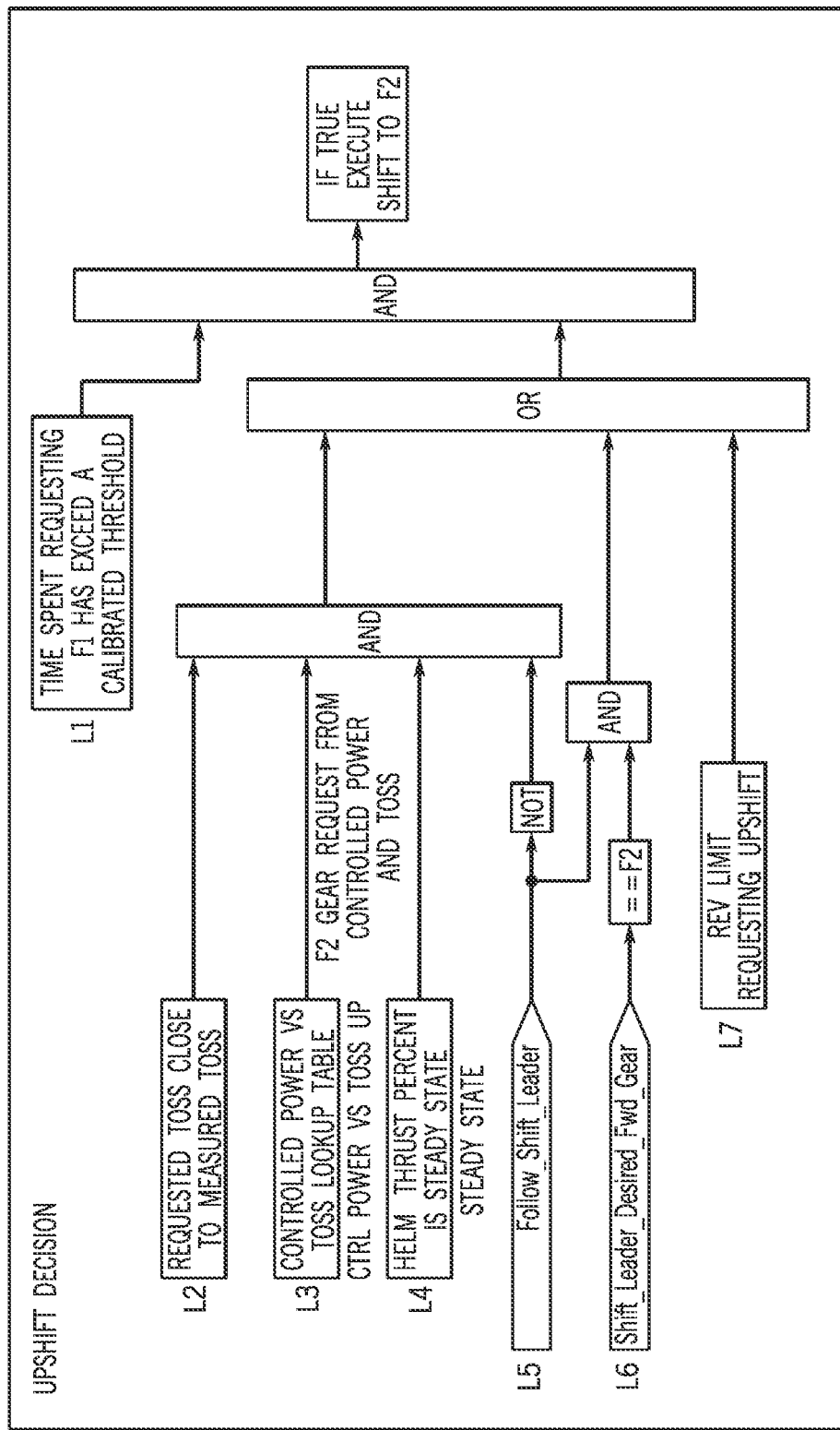
FIG. 6 is an exemplary logic schematic for determining when to upshift a multi-speed transmission according to the present disclosure.

FIG. 6 depicts a schematic of exemplary logic segments for determining when to upshift a multi-speed transmission according to the present disclosure. It should be recognized that while a specific set of individual logic segments is shown working in conjunction, the present disclosure also contemplates these logic segments being used alone, in differing combinations with others shown in FIG. 6, and/or in conjunction with other logic segments known in the art. In most cases, each logic segment returns a value of TRUE or FALSE. The logic then causes the transmission to upshift to second gear F2 based on the logical operators shown, subject to other limitations to be discussed below (for example, safeguards and the like).

Logic segment L1 determines whether the time spent requesting the transmission to be in first gear F1 has exceeded a calibrated threshold. In other words, logic segment L1 requires a certain amount of time to pass before shifting from first gear F1 to second gear F2. This creates hysteresis to prevent toggling between gears under certain, borderline conditions. Rapid changing of gears causes an inconsistency in the filling of the clutches from the normal calibration. Through experimentation and development, the present inventors have identified a time of 4 seconds as the threshold for logic segment L1 to be sufficient to make the next shift consistent. Once this calibrated threshold has been exceeded, logic segment L1 returns a value of TRUE (as determined by the control system 200 previously discussed, for example).

Logic segment L2 determines whether the transmission output shaft speed (TOSS) being requested from the helm is sufficiently close to an actual or measured TOSS, for example as measured by the transmission output shaft sensors (S3) 112a-112c shown in FIG. 3 and previously discussed. In short, logic segment L2 determines whether the acceleration being requested of the marine propulsion devices 101a-101c is presently being met. Certain embodiments reference a 1-dimensional table of acceptable actual TOSS values for a given requested TOSS value to determine whether the requested and actual TOSS values are close enough for logic segment L2 to be TRUE. In other embodiments, an absolute or relative threshold is used, for example requiring the actual TOSS to be within +/−200 RPM and/or within 90-110% of the requested TOSS to return logic segment L2 as TRUE.

Figures 7, 8:
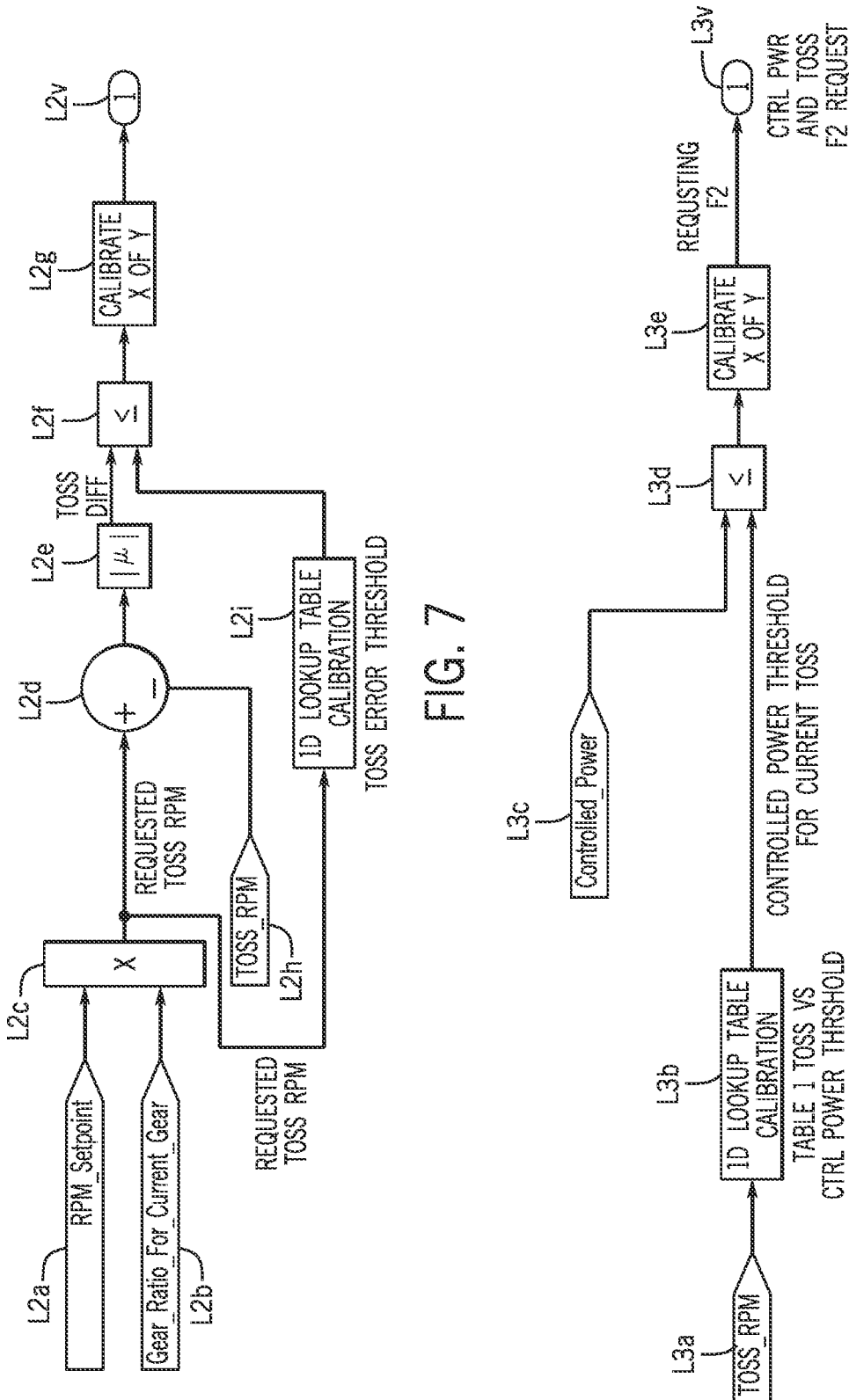
FIGS. 7-9 are schematic views of portions of the logic shown in FIG. 6 corresponding to logic segments L2-L4, respectively.

Logic segment L2 is also shown in FIG. 7, which shows the requested TOSS being determined as a product of the current RPM setpoint (subsegment L2a) for the powerhead (e.g., the controlled power) and the gear ratio for the currently engaged gear (subsegment L2b) of the transmission. This product (subsegment L2c) is then compared to the actual TOSS (subsegment L2h), here as a simple subtraction. The product from subsegment L2c is also compared to a calibration threshold (subsegment L2f), which here is a 1-dimensional lookup table. One example of a 1-dimensional lookup table includes the following calibration thresholds: a TOSS difference of 50 at 3500 RPM, 150 at 4200 RPM, 250 at 4500 RPM, 350 at 5000 RPM and at 5400 RPM, and 1350 at 6400 RPM. The absolute value is determined in subsegment L2e for the difference calculated in subsegment L2d, whereby the absolute value is then compared to the threshold of subsegment L2i to determine whether the actual TOSS is within the allowable threshold of the requested TOSS (the RPM setpoint of subsegment L2a).

In the example shown, the number of instances in which the calibration threshold is exceeded is processed with an "x out of y" type determination (subsegment L2g). In short, the x out of y determination requires that a given condition (here, the difference in requested and actual TOSS exceeding the calibration threshold) is TRUE for at least "x" out of the previous "y" determinations, which desensitizes the data to ensure a real and sustained difference is present. Additional information regarding the x out of y type calculation is provided in U.S. Pat. No. 10,322,786, which is incorporated by reference herein. Other types of time-based thresholds may also or alternatively be applied to desensitize the data, including the use of integrals and/or requiring a difference beyond the allowable threshold to remain (or an average difference to remain outside the allowable threshold) for a certain period of time (e.g., 2 seconds).

If logic segment L2 is determined to be FALSE, meaning that the marine propulsion devices 101a-101c are not accelerating as requested, the present inventors have recognized that it would be detrimental to cause an upshift, which would further hinder acceleration.

With reference to FIGS. 6 and 8, logic segment L3 compares the controlled power (subsegment L3c) determined for operating the marine propulsion devices 101a-101c against a one or more upshift thresholds within an upshift schedule. The upshift thresholds correspond to the current TOSS (subsegment L3a) measured for that marine propulsion device. As will be discussed further below with respect to a similar downshift schedule, different upshift thresholds within the upshift schedule may be employed under different operating conditions. In other words, in certain embodiments there are exceptions in which an upshift (or downshift) schedule is not be followed.

Each upshift threshold is a minimum controlled power desirable for operating at a given TOSS. The present inventors have recognized that if the marine propulsion device is providing a given TOSS via a lower than expected controlled power, additional power remains in the powerhead and an upshift may be advantageous in utilizing that additional power (and/or operating more efficiently, with less fuel). The upshift schedule may be in a lookup table (e.g., a 1-dimensional table) with upshift thresholds indexed based on TOSS values (e.g., TOSS lookup table subsegment L3b) or other data formats within the data 224 of the memory system 220 shown in FIG. 4. It should be recognized that all upshift thresholds may be stored within one data structure, multiple data structures, and/or be stored along with the downshift thresholds within the downshift schedule discussed below. For example, the method 300 of FIG. 10 shows the upshift and downshift thresholds being stored as upshift and downshift schedule data 301 in two or more separate files.

In logic segment L3 of FIG. 8, the controlled power (subsegment L3c) and upshift threshold are normalized from 0 to 100 corresponding to the lowest and highest possible values for controlled power. If the controlled power is determined in subsegment L3d to be less than the upshift threshold (subsegment L3b, here a 1-dimensional lookup table), and the threshold of an "x out of y" desensitization (subsegment L3e) is also satisfied as discussed above, a TRUE value is outputted at subsegment L3v from logic segment L3. In this manner, logic segment L3 determines whether the powerhead has sufficient power available to be operating in the next gear, returning a TRUE value in the affirmative.

Figure 10:
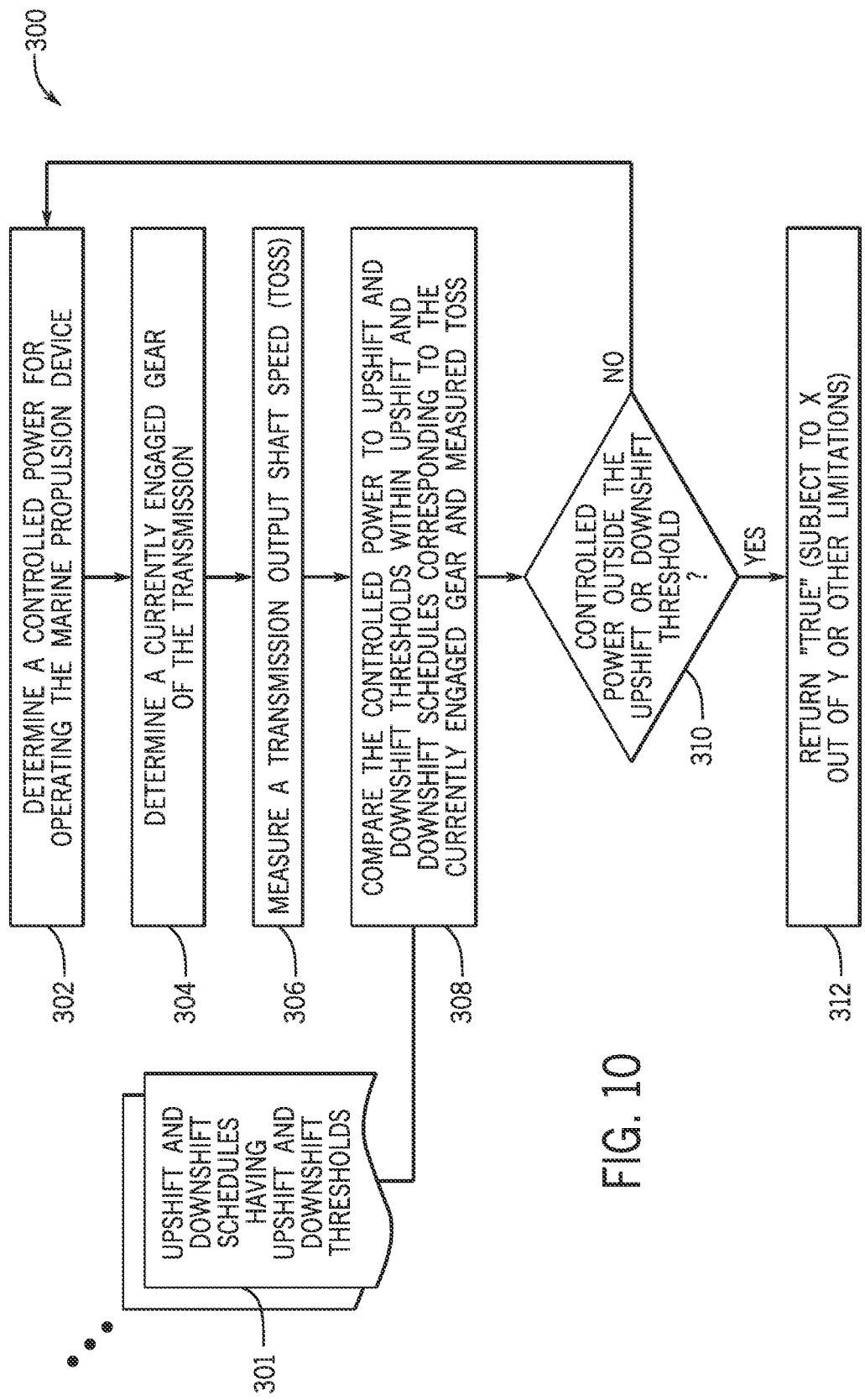
FIG. 10 is a flowchart of an exemplary method for shifting a multi-speed transmission in a similar manner to logic segment L3 of FIG. 8.
Figure 11:
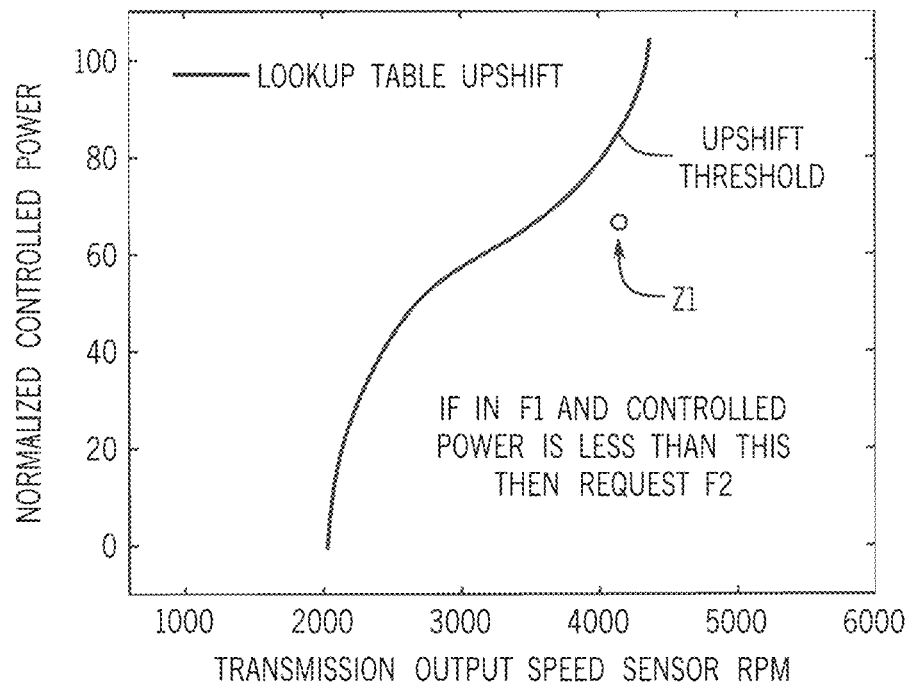
FIG. 11 is a graph depicting an exemplary upshift threshold for upshifting within logic segment L3 as depicted in FIG. 8 according to the present disclosure.

Additional information regarding logic segment L3 is provided in the exemplary method 300 shown in FIG. 10 with an exemplary upshift threshold within an upshift schedule for controlling upshifting (e.g., from first gear F1 to second gear F2) provided in FIG. 11. In the method 300 of FIG. 10, the process begins with step 302 as determining a controlled power for operating the marine propulsion device using methods presently known in the art. In the method 300 shown, step 304 also provides for determining a currently engaged gear within the transmission, whereby in the current example the upshift threshold is specific to the presently engaged gear (with FIG. 11 corresponding to an upshift threshold for shifting from first gear F1 to second gear F2, for example). It should be recognized that Step 304 need not be performed in all embodiments, for example those in which there are only two forward gears, and thus the only upshift while underway is from first gear F1 to second gear F2.

Step 306 then provides for measuring the TOSS of a given marine propulsion device 101a-101c, which as discussed above may be through measurement by the TOSS sensors (S3) 112a-112c. Step 308 then compares the controlled power to a shift threshold (for logic segment L3, an upshift threshold) within upshift schedule and downshift schedule data 301 having one or more upshift and/or downshift thresholds, respectively. The specific upshift or downshift schedule chosen for comparison in step 308 corresponds to the measured TOSS and engaged gear. For logic segment L3, the shift threshold used to determine whether to upshift is an upshift threshold. However, as will become apparent below, a similar method is also applicable to downshifting by comparing to a downshift threshold. The upshift shift and downshift schedule data 301 may be stored in the memory system 220 as discussed above and shown in FIG. 4.

If it is determined that the controlled power is outside the upshift threshold (in the example of FIG. 11, corresponding to the controlled power being below the upshift threshold) a TRUE value is returned from logic segment L3. This TRUE value may then be subjected to an x out of y comparison or other limitations, for example, as discussed above. The example point Z1 of FIG. 11 corresponds to a normalized controlled power of 65% for 4050 RPM in first gear F1, for example, which is below the upshift threshold (thereby supporting an upshift). If instead it is determined in step 310 that the controlled power is not outside the upshift threshold, the process continues and the logic of logic segment L3 returns a FALSE value.

Figure 9:
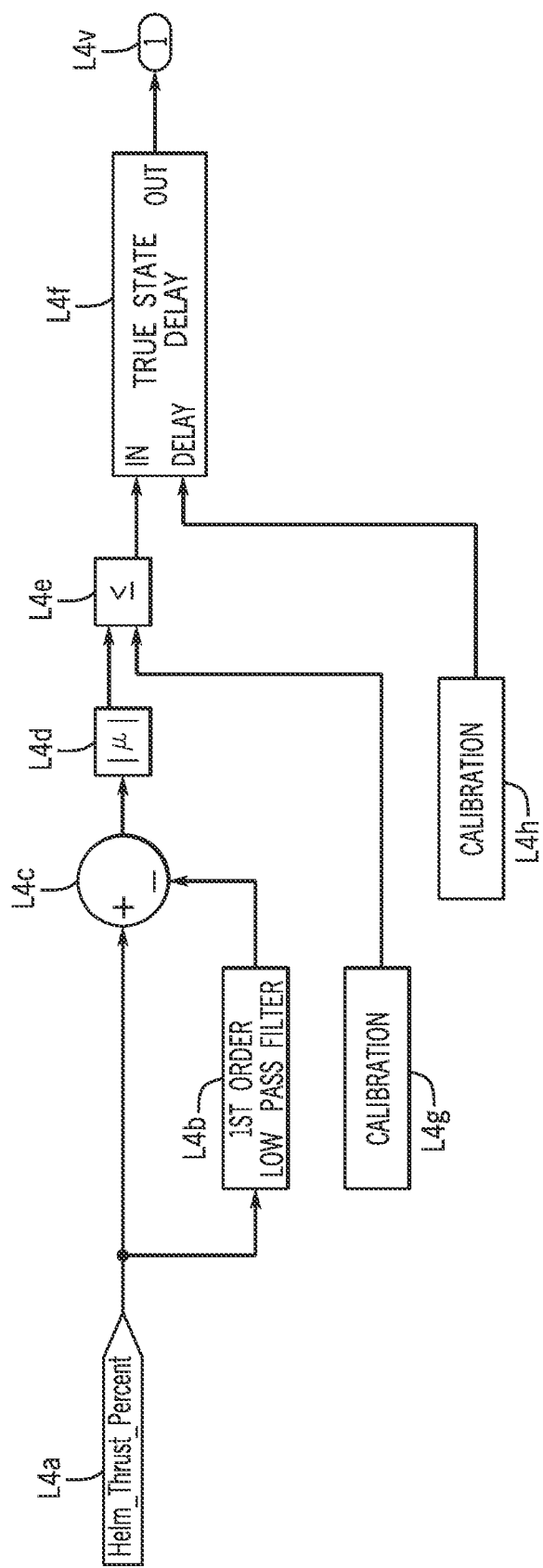

With reference to FIGS. 6 and 9, logic segment L4 provides for determining whether the helm thrust percentage being requested from the helm 80, or generally the requested speed for the marine vessel, is in steady state. In this example, it is important to recognize that the helm thrust percent includes whether the throttle controls 88a-88c are static or changing, but may include other factors for varying the throttle valves 106a-106c of the marine propulsion devices 101a-101c. For example, the joystick control or cruise control systems discussed above may vary the helm thrust percent to satisfy the respective functions. In the embodiment of FIG. 9, this determination of whether the helm thrust percent is changing includes performing a first order low pass filter (subsegment L4b) of the helm thrust percent (L4a) to determine whether the helm thrust percent remains the same or is changing over time. In the embodiment shown, the absolute value (subsegment L4d) of the output of the low pass filter from subsegment L4c is compared to a threshold (subsegment L4g), which in certain embodiments is 1.5%. If the absolute value is less than this threshold, the results are subjected to a True State Delay in subsegment L4f, which requires to the condition to be true for at least as long as a time threshold (e.g., 600 ms) in subsegment L4h before outputting TRUE at subsegment L4v. A similar process is also described for the false state delay of subsegment L54c in FIG. 17, as discussed further below. It should be recognized that other mechanisms known in the art may be used to determine whether the requested helm thrust percent is stable or changing.

In short, the present inventors have recognized that if the helm thrust percent is found to not be steady state in logic segment L4 (for example if the operator is controlling the marine vessel 12 in rough seas and attempting to navigate waves with frequent changes to the throttle controls 88a-88c), it would be disadvantageous to upshift to second gear F2. In this situation, the greater torque provided by first gear F1 would provide better control and acceleration, and thus logic segment L4 returns a FALSE value. As with other logic segments, it will be recognized that various calibrations (L4g, L4h) and thresholds may be included for comparison in logic segment L4, similar to those described above. By way of example, the threshold for subsegment L4e may be between 1 and 4% and the threshold for subsegment L4h may be between 0.5 and 2 seconds.

The present disclosure also relates to another problem identified by the present inventors when introducing shifting to a marine vessel having multiple marine propulsion devices. In particular, the present inventors have observed that having the marine propulsion devices shifting independent of one another results in an uncoordinated sound that is displeasing to the operator. In contrast, marine propulsion devices that shift closely together in time give the impression of a high quality, intelligently controlled system.

The present inventors have also recognized advantages to shifting the transmissions 110a-110c of marine propulsion devices 101a-101c in close proximity to each other with respect to the noise, vibration, and harshness (NVH) of operating the marine vessel 12. In certain configurations, the present inventors have identified an optimal period of shifting the transmissions to be within 250 ms of each other, which is perceived as being a single or coordinated event. However, the present inventors have also recognized issues with automatically shifting all marine propulsion devices 101a-101c at the same time. First, performance and/or safety of the marine propulsion device can be sacrificed if automatically following a shift leader without first considering the present state of the shift follower. In this case, the benefits to NVH in some circumstances are outweighed by the loss of performance when one or more follower devices are not sufficiently close to when each would independently decide to shift. Moreover, as discussed further below, the present inventors have also recognized another issue arises with shifting the multiple marine propulsion devices in too close of succession (e.g., within less than 20 ms of each other), which can be additive in NVH, and thus undesirable as well.

In the embodiment of FIG. 6, logic segments L5 and L6 together provide for a determination of whether a given marine propulsion device 101a-101c should shift at the same time (i.e., become a "shift follower") when a "shift leader" among the marine propulsion devices 101a-101c determines that it will shift. In other words, once a marine propulsion device 101a-101c that is designated as the shift leader determines that it will shift, the other marine propulsion devices 101a-101c (shift followers) each determine whether to follow the shift leader in also shifting with the shift leader, or to continue to act independently and shift on its own schedule. In other words, the shift followers determine whether conditions are met to ignore their own follower shift schedule (which does not yet call for shifting) to follow the shift recommendation from the shift schedule of the shift leader, as discussed further below.

FIGS. 14-17 depict four steps for performing an exemplary logic segment L5 of FIG. 6 to determine whether to follow a shift leader in shifting. It will be recognized that the same general logic also pertains to logic segment L11 with respect to determining whether to follow a shift leader in downshifting, as discussed further below. In certain embodiments, one of the marine propulsion devices 101a-101c is designated as the shift leader in the factory or designated at the time of system configuration and installation. This designation of being the shift leader may be positionally dependent, for example choosing the marine propulsion device with the propeller deepest within the water (for example, a center marine propulsion device where three are mounted to a single marine vessel). In this configuration, the present inventors have recognized that the TOSS RPMs are more consistent at a greater depth due to less cavitation and general disturbance while turning, for example. Any marine propulsion device not designated as the shift leader may thereby be deemed a shift follower, or this may be explicitly designated.

Figure 14:
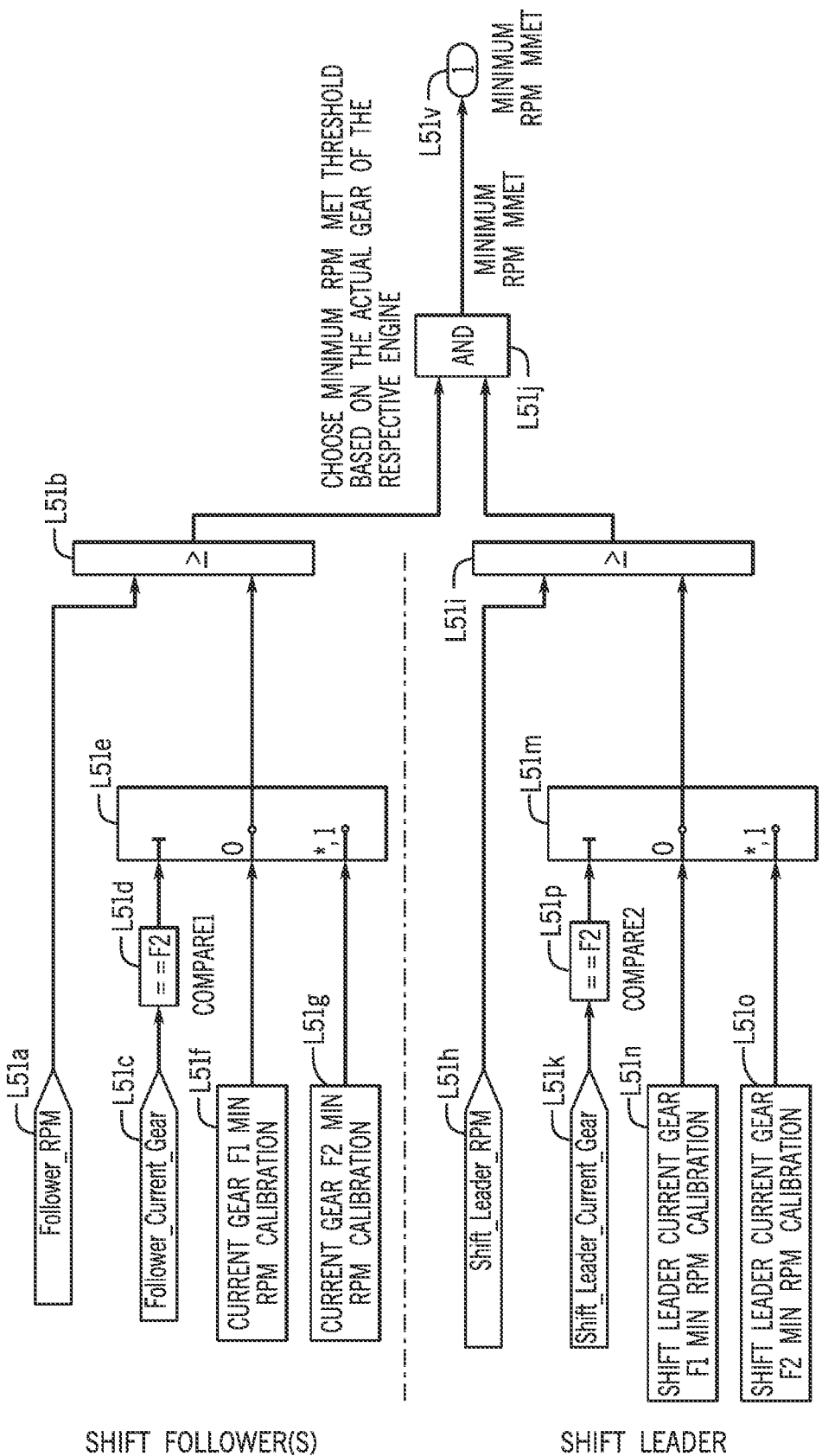
FIGS. 14-17 are a schematic views of exemplary steps 1-4 for performing logic segment L5 of FIG. 6, which also generally relates to performing logic segment L11 of FIG. 20.

FIG. 14 depicts step 1 of logic segment L5, which provides for determining whether the RPM of the powerhead for both a shift leader and a shift follower are sufficiently high in their current gear such that each marine propulsion device will have enough RPM to perform well after up shifting.

In the logic segment L5 as shown in FIG. 14, the upper half of the schematic refers to comparisons made by each shift follower within the marine propulsion devices, with the bottom half relating to the shift leader. The powerhead RPM (or alternatively TOSS RPM) for both the prospective shift follower (also referred to as the shift follower for simplicity) and the shift leader are determined using methods presently known in the art (subsegments L51a and L51h). Likewise, the currently engaged gear for both the shift follower and the shift leader are determined (subsegments L51c and L51k). In the example shown, the current gears of the shift follower and the shift leader are compared to being in the second gear F2 in subsegments L51d and L51p to determine which a calibrated RPM to reference. If the shift follower is in first gear F1, the calibration of subsegment L51f is applied (whereas for second gear F2, subsegment L51g is applied). Similarly, if the shift leader is in first gear F1, the calibration of subsegment L51n is applied (whereas for second gear F2, subsegment L51o is applied). Switches L51e and L51m compare the current gears to the appropriate calibrations to determine the minimum RPM at which an upshift would be permissible. The minimum RPM values for the shift follower and the shift leader are then compared in subsegments L51b and L51i to the actual RPMs of the shift follower and the shift leader from subsegments L51a and L51h described above.

If the actual RPMs of subsegments L51a and L51h are determined in subsequent L51j to both exceed the corresponding minimum RPMs, the minimum RPM condition L51v is determined to have been met, and step 1 of logic segment L5 reports a value of TRUE.

The present inventors have recognized that to ensure optimal speed and performance in performing shifting of the multi-speed transmissions, each shift follower must make the determination of whether or not conditions are satisfied to follow a shift leader continuously and essentially in real-time. In this manner, if a shift follower is in condition to follow the shift leader, that shift follower can follow the shift leader with essentially no delay, as no further calculations are required.

Figure 15:
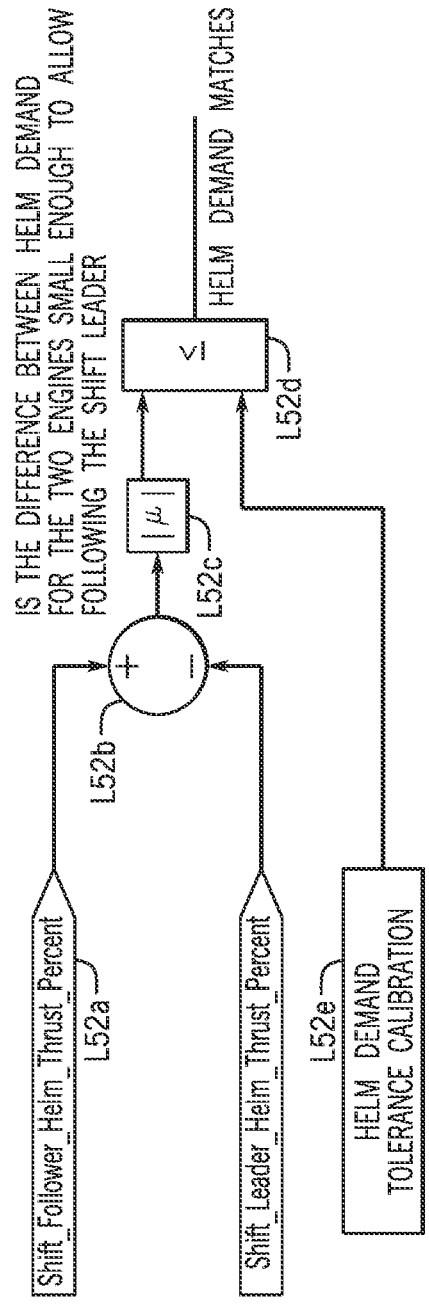

FIG. 15 depicts step 2 of logic segment L5, which provides for determining whether the helm thrust percentage requested of the shift follower is sufficiently close to the helm thrust percentage requested of the shift leader. The helm thrust percent was discussed previously above, particularly with respect to logic segment L4, and is also referred to herein as simply a "thrust request". In particular, step 2 of logic segment L5 determines whether the throttle levers of the shift follower and the shift leader are sufficiently close to shift them together. If the shift follower's throttle percentage is indeed comparatively low, the system 100 assumes that, despite the shift leader being ready to shift, the shift follower is likely not, and/or the operator is not using these marine propulsion devices in the same manner. In other words, since the shift leader and shift follower are operating at significantly different throttle percentages (i.e., compared to the allowable range stored in the tolerance calibration of subsegment L52e), optimizing the performance of the shift follower by shifting on its own schedule is preferred to prematurely shifting in the name of NVH considerations. An example of an allowable difference between shift leader and shift follower helm thrust percent is 10%. If the absolute value (subsegment L52c) of the difference between these values (subsegment L52c) is less than the allowable difference in subsegment L52e, the operator is requesting similar power from the two marine propulsion devices and thus step 2 of logic segment L4 returns a value of TRUE, indicating that following the shift leader is suitable.

Figure 16:
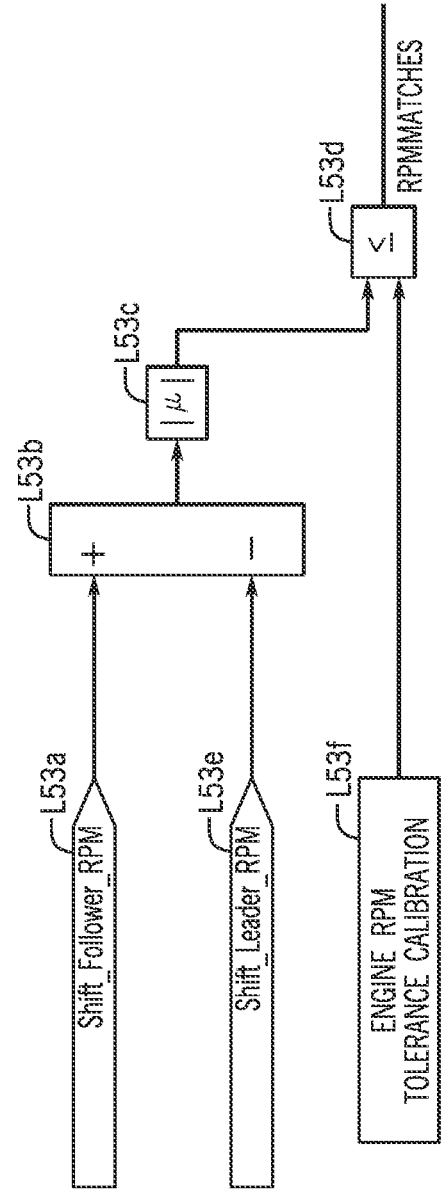

FIG. 16 continues with step 3 of logic segment L5, which determines if the RPMs of the shift leader and the shift follower are sufficiently close to each other, specifically as compared to a tolerance calibration (subsegment L53f). Here the RPMs of the powerheads are shown in subsegments L53a and L53e; however, it will be recognized that the RPMs measured by the TOSS of each marine propulsion device 101a-101c may alternatively be used. Similar to the helm thrust percentage discussed in step 2 of logic segment L5 (FIG. 15), the shift follower will not follow the shift leader in shifting if the corresponding RPMs are substantially different RPMs. In the example shown, the absolute value (subsegment L53c) of the difference in RPMs (subsegment L53b) is once again compared (in subsegment L53d) to a tolerance calibration (subsegment L53f) to determine when this difference is substantial enough to preclude the shift follower from following.

Figure 17:
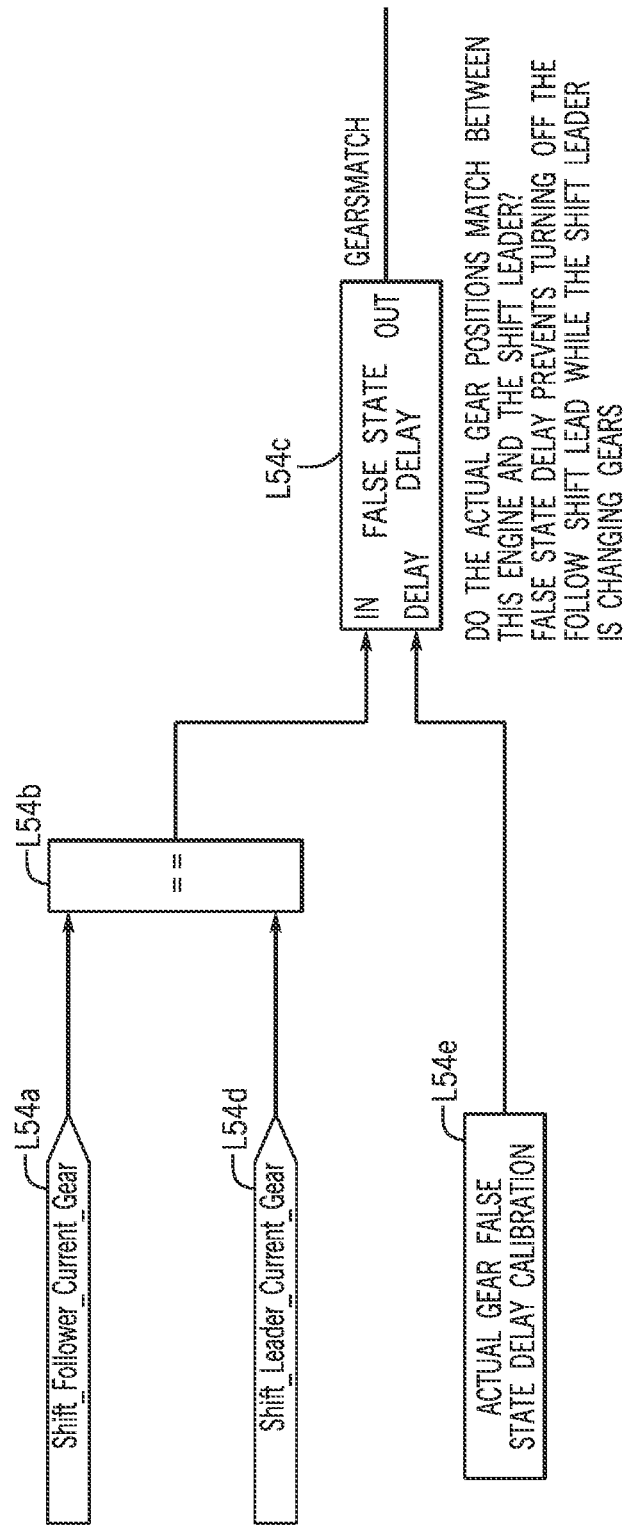

FIG. 17 provides step 4 of logic segment L5, namely determining if the shift follower is currently in the same gear as the shift leader. This step recognizes that if two marine propulsion devices are not presently in the same gear, the fact that the shift leader is ready to shift does not correlate to a shift follower in another gear also being ready to shift. In this case, the present inventors have recognized that the performance would be optimized by allowing the shift follower to determine its own optimal time to shift.

Beyond determining in subsegment L54b that the current gears of the shift follower and the shift leader are the same (subsegments L54a and L54b), the present inventors have recognized that it is advantageous to include a false state delay (subsegment L54c) within the logic. The false state delay ensure that if the shift leader has just begun to shift, it is not determined to be in a different gear as compared to the shift follower. In other words, this prevents the decision to shift the shift leader into second gear F2 to being considered actually in second gear F2, which would preclude all instances of shift followers satisfying step 2 to follow the shift leader. In certain embodiments, the delay (in subsegment L54e) for use in the false state delay L54c is 600 ms. In total, if all four steps of logic segment L5 report a TRUE value (in other words, all conditions have been met), the shift follower will follow the shift leader in shifting, or in other words will adopt the shift leader's "desired forward gear" as its own. A shift request will automatically be provided for the shift follower based on the shift recommendation from the shift schedule associated with the shift leader, despite the shift schedule associated with the shift follower not indicating a shift recommendation at that time. It should be recognized that the same process may be simultaneously executed across multiple marine propulsion devices as prospective shift followers so as to shift in coordination with the shift leader (for marine propulsion devices meeting the conditions described above). As will be discussed further below, this is subject to additional limitations, including that the shift follower will not follow if doing so is expected to meet or exceed the shift follower's redline RPM for operating its powerhead, for example.

Through experimentation and development, the present inventors have recognized that the shift following process is optimally started for the follower based on the decision to shift the leader, rather than the leader actually shifting to the next gear. In particular, a shift event may nominally take 600 ms to occur, and thus waiting this time or a substantial portion of it can destroy the feeling of coordinated shifting for the shift follower(s). To this end, the present inventors have discovered that an optimal time to determine whether a shift follower will follow the leader is the moment in which the decision to shift the leader occurs.

This strategy also prevents another undesirable NVH effect that the present inventors have identified with respect to shifting transmissions at the opposite extreme, in this case too closely together. Through experimentation and development, the present inventors have recognized that when transmissions are shifting too closely together (e.g., 20 ms), the collective shifting sound is undesirable from an NVH perspective. To this end, the present inventors have identified that in certain configurations, following closely behind the shift leader (but not purposely produce exact synchronization among the marine propulsions devices) provides an optimal NVH result. As discussed above, this optimal delay in shifting may be between 20-250 ms. The present inventors have further recognized that in certain embodiments, this range of optimal delays permits configuring the system to communicate among and between the shift leader and shift follower (e.g., in performing the steps of logic segment L5) at slower rates, such as every 200 ms. Even by communicating at 200 ms, the processing delay results in the marine propulsion devices shifting within the optimal window of 250 ms. Thus, by slowing down the communication rates, the demand by each marine propulsion device on the CAN network (as discussed above) can be reduced, which the present inventors have recognized to be highly advantageous as the number of marine propulsion devices being placed on a single marine vessel increases.

The present inventors have further identified that the process of logic segment L5 is advantageously robust against system errors. For example, a failure to communicate with the shift leader (e.g., a broken system, the shift leader being keyed off, and/or communication errors) simply results in a shift follower following its own shift schedule. The disclosed systems and methods also function regardless of which marine propulsion device has been designated as the shift leader.

It should be recognized that in certain embodiments, the function of coordinating shifting between a shift leader and shift follower(s) may be handled by a module outside of the marine propulsion devices themselves. However, the present inventors have identified the previously described configuration to be particularly fast-acting and with a minimal drain on the CAN network. In any configuration, very little information is passed between the marine propulsion devices to coordinate the shifting therebetween according to the present disclosure.

Figure 13:
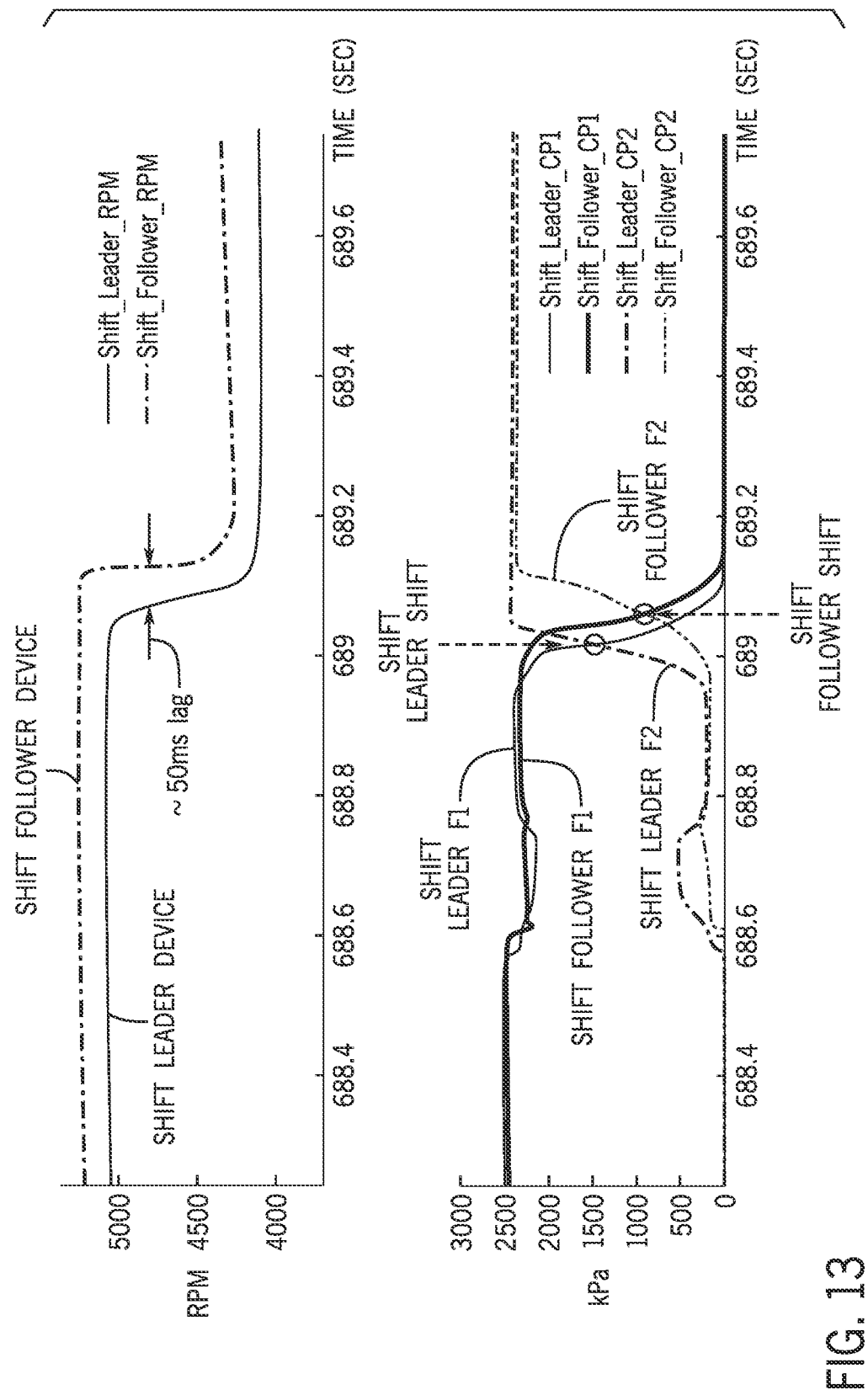
FIG. 13 includes two graphs depicting exemplary data corresponding to coordinating the upshifting of transmissions across multiple marine propulsion devices according to the present disclosure.

FIG. 13 shows two graphs of exemplary data for a shift follower among the marine propulsion devices following a shift leader according to the present disclosure (in particular, applying logic segment L5 as discussed above). As shown in the upper graph, the RPM of the powerhead for the shift leader rapidly drops from an upper plateau in first gear F1 to a lower plateau in second gear F2, followed shortly after by a similar transition in RPM for the shift follower. There is a very brief lag in the RPM of the shift follower dropping after that of the shift leader (here approximately 50 ms), caused by the processing delay in recognizing that the shift leader has requested a shift, that the shift follower meets all conditions to follow the shift leader, and the shift follower actually starting to shift accordingly. As discussed above, this falls within the idea range of following the leader so as to sound coordinated, but not result in additive NVH effects.

To eliminate or minimize further delay, the determination of the non-shift leader device's own desired gear and the monitoring of the shift leader device's desired gear are each performed continuously and in real time. In this manner, the moment that a shift request is received for shifting the shift leader according to its shift schedule, the shift follower can immediately follow the shift leader, or decide to not follow (i.e., continue to follow its own schedule), without requiring further calculation. The lower graph of FIG. 13 also shows the respective pressures first clutch pressure CP1 and second clutch pressure CP2 for the first gears F1 and second gears F2, respectively, of the shift leader and shift follower. It should be recognized that each shift from the first gear F1 to the second gear F2 occurs approximately were the corresponding first clutch pressure CP1 and second clutch pressure CP2 intersect. In the example shown, the shifts occur approximately 50 ms apart, which as noted above provides very desirable NVH performance and a positive user experience.

It should be recognized that while the description above focused on shifting a shift follower early to follow a shift leader, the present disclosure also contemplates configurations in which a shift follower is delayed to coordinate shifting with the shift leader. For example, the system may be configured such that if a shift follower starts the shifting process on its own, but then calculates that the shift leader is shifting (and that conditions are met to follow the leader), the shift process of the shift follower may be halted or restarted so as to follow the shift leader rather than completing the shift before the shift leader.

As discussed above, certain conditions may cause a marine propulsion device to upshift even if other logical segments would otherwise not lead to shifting. For marine propulsion devices having a single-speed transmission, the propeller is typically chosen such that positioning the throttle lever at full speed (100%) will cause the powerhead to operate near, but just below, its predetermined redline value. However, the present inventors have recognized that the introduction of a multi-speed transmission introduces a new problem. Specifically, while it remains desirable to configure the system to operate just below redline in the highest gear (e.g., second gear F2), the same powerhead can now be run well above redline RPM if the multi-speed transmission is not shifted out of first gear F1.

Moreover, the present inventors have recognized that it is advantageous not simply to upshift any time before reaching the redline RPM, but to shift so as close to the redline RPM as possible to ensure maximum acceleration. Shifting may be started when the RPM reaches a redline prevention shift RPM selected such that the shifting completes (and consequently, the RPM drops) before the RPM reaches the redline RPM. However, simply setting the redline prevention shift RPM to initiate shifting very early (e.g., set for a fast vessel that accelerates quickly, and thus can quickly reach the redline RPM) penalizes the performance of a slower vessel. If the shift is completed after the redline RPM has been exceeded, damage may result to the powerhead and/or in configurations in which an engine protection system is provided, fuel and/or spark to the cylinders may be automatically reduced to reduce this RPM of the powerhead (thus inhibiting performance). In contrast, if the shift is completed too soon, acceleration performance suffers.

Figure 18:
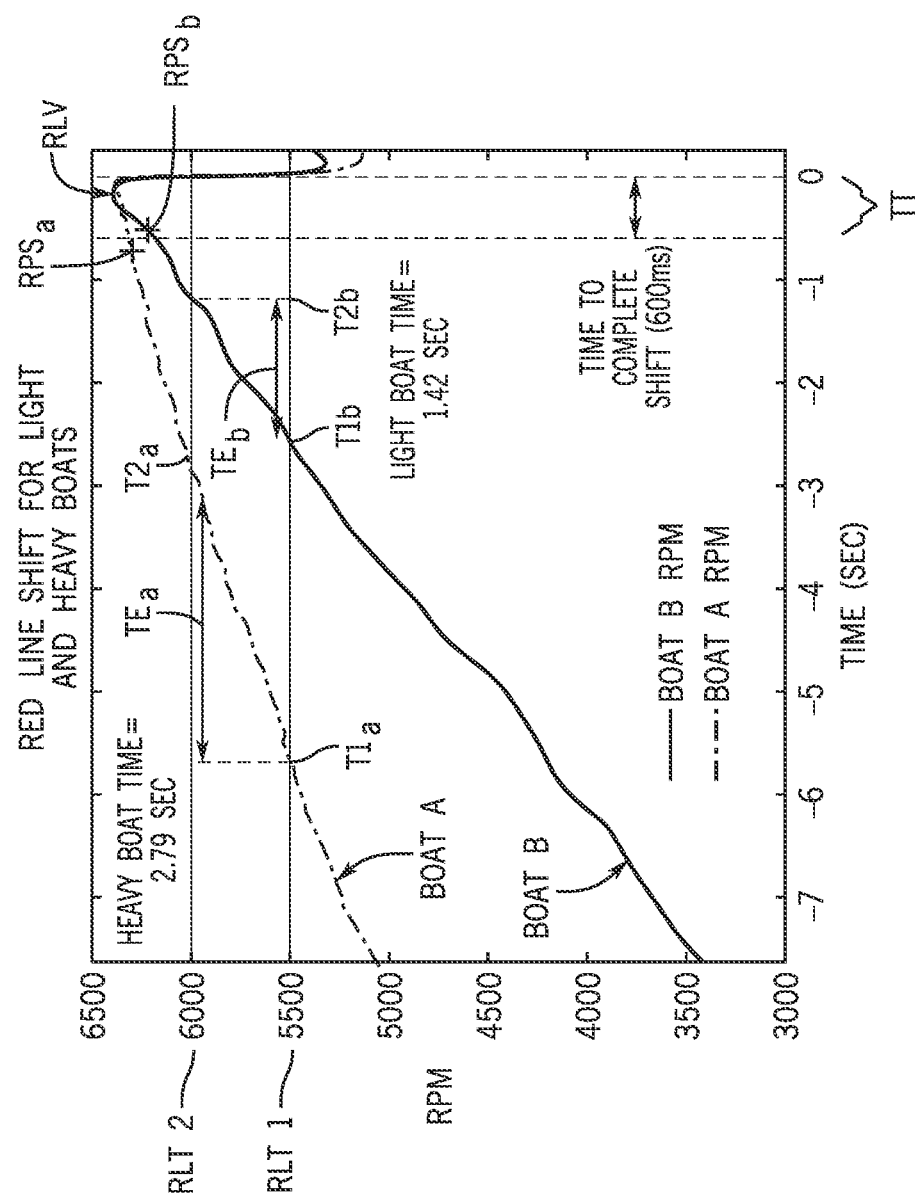
FIG. 18 is a graph depicting exemplary experimental data corresponding to shifting in accordance with logic segment L7 of FIG. 6.

With reference to FIG. 18, the present inventors have recognized that the transition time TT for shifting a multi-speed transmission, for example from first gear F1 to second gear F2, takes a known approximate time to complete, shown here to be a transition time TT of approximately 600 milliseconds. Likewise, the redline values RLV for the powerhead of the marine propulsion devices are also known, shown here as approximately 6,400 RPM. Consequently, the present inventors have recognized that the point at which the shift event must begin to not exceed this redline value RLV, but to still complete the shift as close to the redline value RLV as possible, can be determined by analyzing the slope of the acceleration for each marine propulsion device in use. As discussed above, marine propulsion devices having the same calibration techniques may be mounted on different boats and in differing quantities, resulting in consistent performance.

For example, FIG. 18 depicts the RPMs for two boats over time (boat A and boat B), which while in this case reaching the redline values RLV at the same time, did so at substantially different rates (i.e., the RPM of boat B increasing much more quickly). The slopes of the RPM waveforms for boat A and boat B can be determined by measuring the time at which each line crosses over a first redline threshold RLT1 and a second redline threshold RLT2, shown here as 5,500 and 6,000 RPM, respectively. For boat A, the RPM crosses the first redline threshold RLT1 at time one $T1_a$ and crosses the second redline threshold RLT2 at time two $T2_a$. By subtracting these times, a time elapsed $TE_a$ can be determined for boat A, shown here as approximately 2.79 seconds between the threshold crossings RLT1 and RLT2. Similar calculations can be done for boat B, whereby subtracting crossings at time one $T1_b$ and time two $T2_b$ result in a time elapsed $TE_b$, approximately 1.42 seconds.

By knowing the slope of the line for each of the boats, the redline value RLV, and the transition time TT (e.g., known to be 600 ms), the optimal point for shifting the transmissions of boat A and boat B can be solved mathematically, or referenced in memory (such as in a lookup table, for example). In the example shown, the calculated redline prevention shift RPM $RPS_a$ for boat A is at approximately 6,300 RPM, and likewise the redline prevention shift RPM $RPS_b$ for boat B at 6,200 RPM. By initiating the shifts for boats A and B at respective redline prevention shift RPMs $RPS_a$ and $RPS_b$, the transition time TT for shifting is accounted for and each boat completes its shift before exceeding the redline value RLV.

In certain embodiments, the slope of the line, and/or determinations of the powerhead RPMs exceeding the first and second redline thresholds RLT1 and RLT2 are performed every time these threshold crossings occur. By determining the redline prevention shift RPM continuously or on a periodic basis, the method accounts for differing operating conditions, changes in the weight of a vessel (e.g., after filling the fuel tanks, loading passengers, changes to propeller pitch, etc.), and/or the like. In other embodiments, in which the redline prevention shift RPM is not determined every time the powerhead RPMs are measured to cross the first and second redline thresholds RLT1 and RLT2, other frequencies may be used, including once per key cycle, once certain time intervals (e.g., once per hour or after 24 hours have lapsed), or as little as one time when a marine vessel is first configured (e.g., in manufacturing or at a dealer).

The present inventors have recognized that the presently disclosed methods result in a dynamic calculation of the RPMs at which a given transmission should upshift for optimal performance, while still preventing the powerheads from exceeding the redline value. Moreover, the same calibration and technique is beneficially applicable regardless of the type of marine vessel and how many marine propulsion devices are installed.

Figure 19:
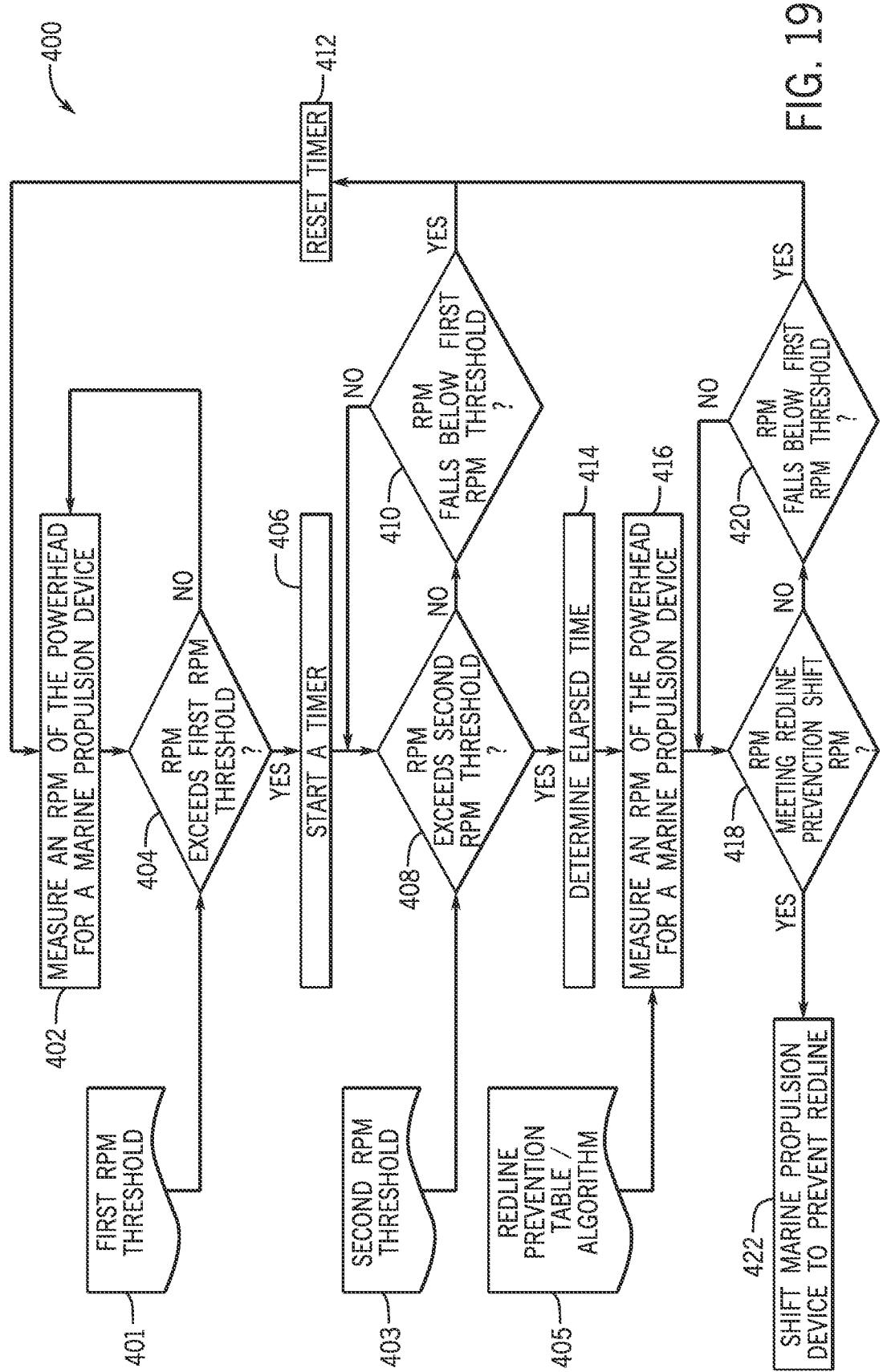
FIG. 19 is a flowchart of an exemplary method for shifting a multi-speed transmission to prevent a redline RPM in accordance with logic segment L7 of FIG. 6.

FIG. 19 depicts an exemplary method 400 for determining the redline prevention shift RPM (previously shown as $RPS_a$ in FIG. 18) of a marine propulsion device according to the present disclosure, for example to be used for logic segment L5 of FIG. 6. The RPM of the powerhead is measured in step 402, for example in a manner described above. Step 404 compares the measured RPM to a first RPM threshold 401 (previously shown as RLT 1 in FIG. 18), which may be stored in the data 224 of the control system 200 in FIG. 4 as discussed above. If the step 404 determination is negative, the process continues at step 402.

If instead the measured RPM does exceed the first RPM threshold, a timer is started in step 406. The timer continues to run unless the RPM falls below the first RPM threshold (step 410), whereby the timer is reset (step 412) and the process returns to step 402. However, if instead the RPM is determined in step 408 to also exceed a second RPM threshold 403 (previously shown as RLT 2 in FIG. 18), the timer is stopped and an elapsed time between exceeding the first and second RPM thresholds is determined in step 414. Step 416 provides for determining a redline prevention shift RPM based on the elapsed time of step 414 and reference to a redline prevention table 405 and/or algorithm. In certain embodiments, the redline preventing shift RPM is determined by inputting the elapsed time into a one-dimensional lookup table that provides the RPM shift point corresponding to completing the transition time TT of the shift just before the redline value RLV is exceeded. The measured RPM of the powerhead is then compared to this redline prevention shift RPM in step 418, which continues unless the RPM falls below the first RPM threshold (as determined in step 420), leading to resetting the timer (step 412) and returning to step 402. However, if the measured RPM of the powerhead does meet the redline prevention shift RPM in step 418, the method 400 provides for controlling the transmission to shift when the RPM measured for the powerhead reaches the redline prevention shift RPM in step 422 such that shifting completes before the powerhead reaches the redline RPM (redline value RLV).

It should be recognized that other methods for accomplishing the purposes of logic segment L7 are also contemplated, including dividing the difference between first and second RPM thresholds by the elapsed time to solve for the slope. The redline prevention shift RPM can then be solved algebraically knowing the calculated slope, as well as the known redline value RLV for the powerhead, for example. As discussed above, the redline prevention shift RPM can be determined on a continuous or repeated basis, whereby a determination of a redline prevention shift RPM from a second time interval replaces that determined for an earlier first time interval. If conditions are not present to make a new redline prevention shift RPM determination in a subsequent time interval, the most recent redline prevention shift RPM determination is used until replaced.

In certain embodiments, the method further comprises monitoring an operator input for controlling the RPM of the powerhead, such as monitoring the position of a throttle lever. If the operator input is determined to change after the first RPM threshold is exceeded (indicating that acceleration is not purely a matter of powerhead performance, but is being manipulated by the operator), the timer is reset to prevent a new redline prevention shift RPM value from being determined and replacing the most recent redline prevention shift RPM determination. Subsequent shifting is controlled using this most recent redline prevention shift RPM determination.

In certain embodiments, the first RPM threshold is at least 70% of the redline valve RLV and/or differs from the second RPM threshold by at least 5% and at most 25%. In certain embodiments, the second RPM threshold is at most 95% of the redline value RLV. In certain embodiments, the redline value RLV is between 6000 and 8000 RPM, and the second RPM threshold is between 200 and 1000 RPM less than the redline value RLV. In certain embodiments, the transition time TT for the transmission is between 0.2 and 2 seconds. However, it should be recognized that the foregoing are merely examples and the present disclosure also contemplates other ranges and values.

Figure 20:
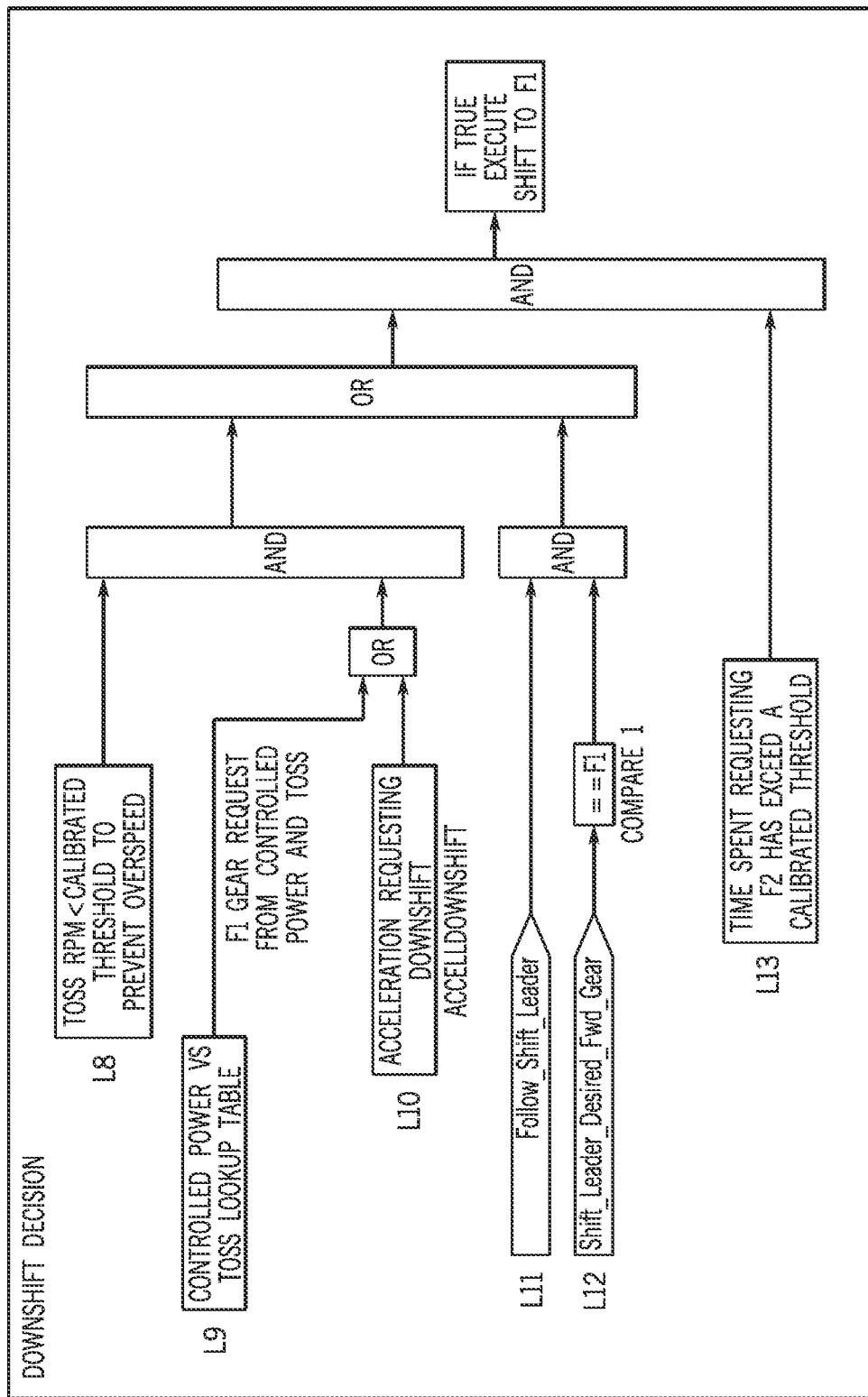
FIG. 20 is an exemplary logic schematic for determining when to downshift a multi-speed transmission according to the present disclosure.
Figure 21:
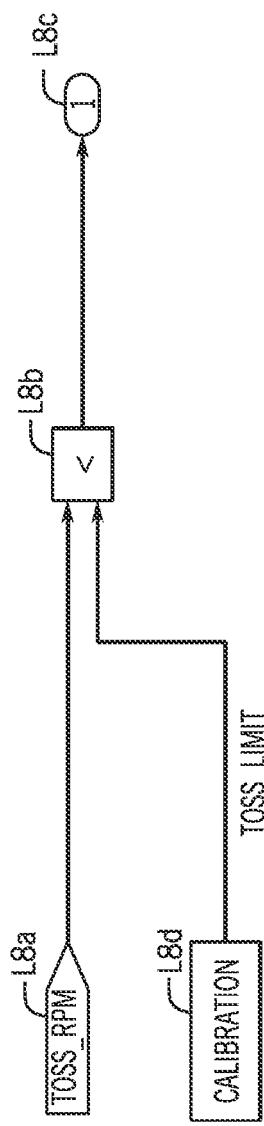
FIGS. 21 and 22 depict schematics of portions of the logic shown in FIG. 20 corresponding to logic segments L8-L9, respectively.

Now in relation to downshifting, FIG. 20 depicts a schematic of exemplary logic segments that work together to determine when a multi-speed transmission should downshift for optimal performance, similarly to the multi-faceted schematic for upshifting of FIG. 6. Logic segment L8 is also shown in FIG. 21, which provides that the TOSS as measured by the TOSS sensors (S3) 112*a*-112*c* (see FIG. 4) are compared to a calibrated threshold (subsegment L8*d*) to prevent overspeed (e.g., a threshold between 4200 and 4800 RPM). When the TOSS RPM is less than this calibrated threshold (as determined in subsegment L8*b*), logic segment L8 is reported as TRUE. In other words, logic segment L8 prevents the transmission from downshifting if the TOSS is already too high, as the consequence would be an even higher RPM once shifted into a lower gear.

Figure 22:
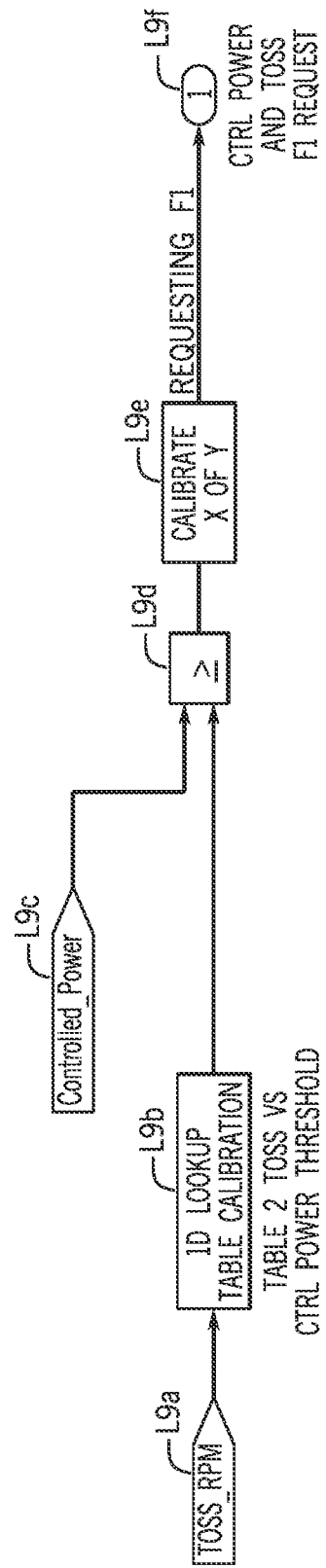

Returning to FIG. 20, logic segment L9 provides for comparison of the controlled power to TOSS using a downshift schedule (e.g., the upshift and downshift schedule data 301 of FIG. 10), which is also shown in FIG. 22. It should be recognized that the comparison of controlled power to TOSS for controlling downshifting in logic segment L9 is similar to that of the logic segment L3 comparison to control upshifting in FIG. 6, discussed above.

In addition to the upshifting controls described above, the present inventors have recognized that by comparing the controlled power of the marine propulsion device to the speed of the marine vessel, the planing speed of the boat hull can be predicted. Moreover, by optimizing shifting based on whether the marine vessel is planing or not planing, the presently disclosed systems and methods provide the operator with the best drivability for acceleration, fuel economy, and NVH. In general, this provides for operating the transmission in first gear F1 before the marine vessel would be able to plane, and utilizing the second gear F2 after the marine vessel is planing. As with the other logical segments provided in this disclosure, the presently disclosed strategy allows for a common prediction strategy across differing hull types and differing marine vessel configurations more generally.

In the particular case of logic segment L9, the presently disclosed systems and methods recognize that when a marine vessel has not planed or falls off plane, the transmission optimally utilizes first gear F1 for the best available propeller torque. This also situates the marine vessel in the best position for getting up on plane, if requested. Logic segment L9 also provides for selecting first gear F1 (or in other words, a downshift to first gear F1) if the marine vessel is subject to high torque loads at a given boat speed and thus requires a lower gear, such as when the marine vessel is cornering.

Figure 12:
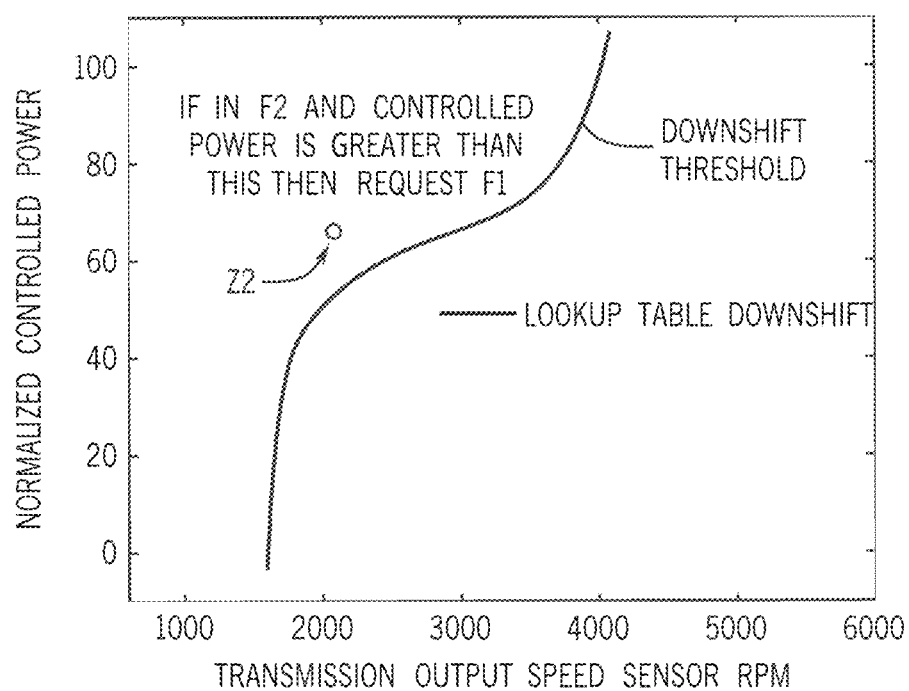
FIG. 12 is a graph depicting exemplary downshift thresholds for downshifting within logic segment L9 as depicted in FIG. 20 according to the present disclosure.

As shown in FIGS. 22 and 12, the current TOSS (subsegment L9*a*) is fed into a downshift schedule (shown as 1-dimensional calibration table, subsegment L9*b*) having one or more downshift thresholds (see FIG. 12) provided as a function of the TOSS. FIG. 12 depicts a downshift schedule having one downshift threshold, whereby the downshift schedule may be stored in memory like that for the upshift schedule of upshift thresholds of logic segment L3 for upshifting (for example, the downshift schedule comprising one or more 1-dimensional tables distinct from those of the upshift schedule).

The controlled power of the marine propulsion device (subsegment L9*c* of FIG. 22) is then compared to the downshift threshold (subsegment L9*d*). The controlled power and downshift threshold may be provided in normalized form from 0-100, as discussed above. If the controlled power is greater than the downshift threshold (in other words, more power is being requested than expected for a given TOSS), subsegment L9*d* returns a TRUE value. In the embodiment shown, the output of subsegment L9*d* is further fed into an x out of y calculation in subsegment L9*e* to desensitize the output in the manner described above. If the result remains TRUE following the desensitization of the x out of y calculation, logic segment L9 reports TRUE in support of downshifting to first gear F1.

This logic is designed to keep the engine operating in first gear F1 when significant torque is required for operation. In the example of FIG. 12, the example point Z2 would provide a TRUE value when compared to the downshift threshold, supporting a downshift (subsegment L9*f*).

As will be discussed further below, the present disclosure further includes two exemplary methods for handling an acceleration downshift request when the marine vessel is not being operated at steady state. Under typical circumstances in which the marine vessel is operated (and speed is requested) at a steady, stable state, shifting requests may be handled by applying the two controlled power versus TOSS tables of logic segments L3 and L9, then desensitized using an x out of y calculation, as discussed above. However, this method is calibrated for optimal performance in a steady state, which the present inventors have discovered does not provide optimal performance when the helm controls correspond to not operating the marine vessel at steady state. Additionally, the present inventors have recognized that when trying to calibrate to accommodate for both steady state and transient behaviors, the result provides inferior performance in each state.

Figure 23:
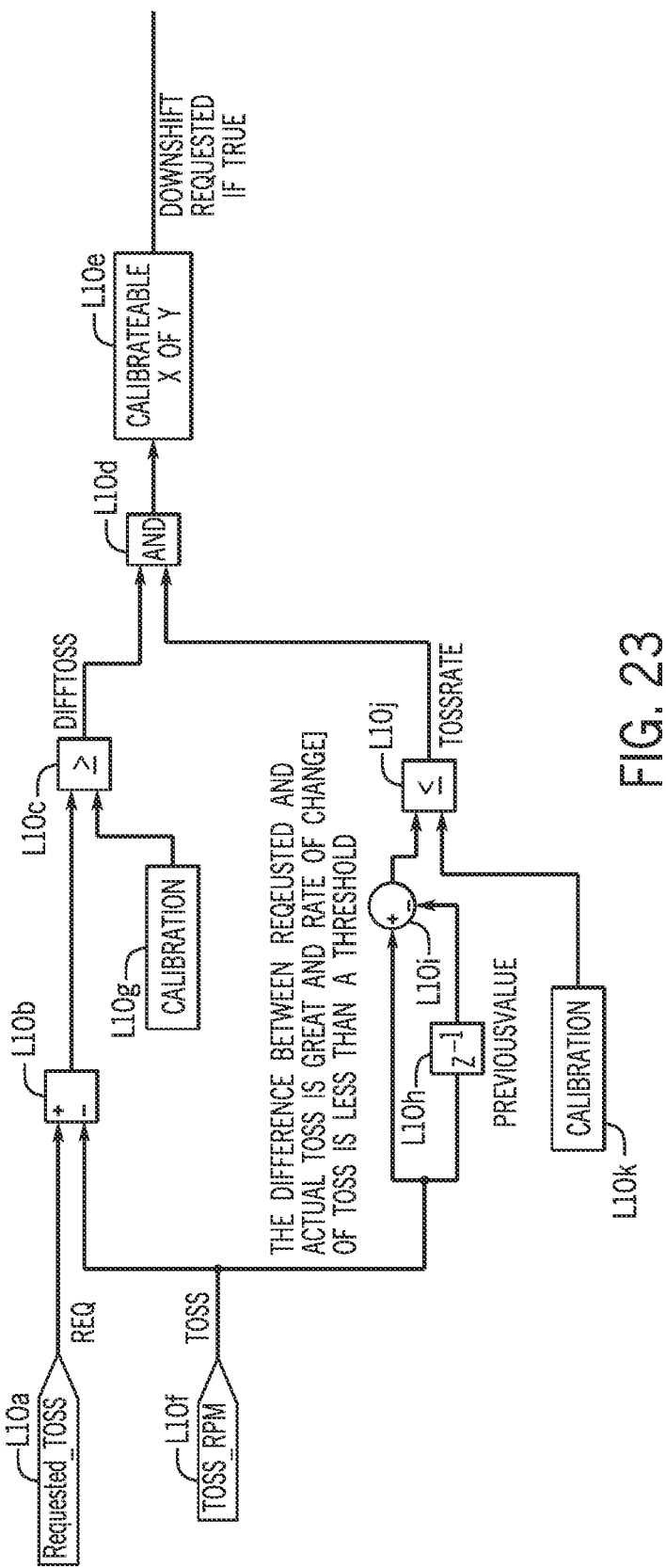
FIGS. 23 and 24 are schematic views of two exemplary methods for performing logic segment L10 as shown in FIG. 20.
Figure 24:
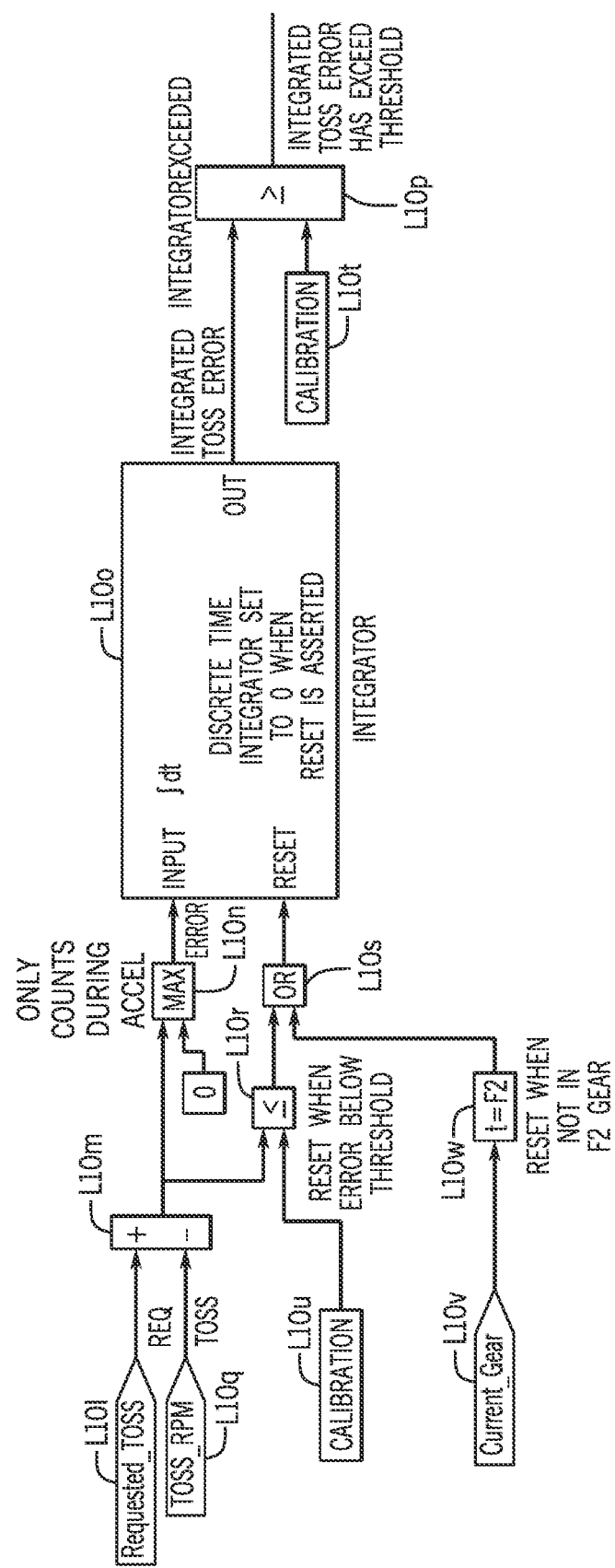

Accordingly, the present inventors have developed the presently disclosed methods for identifying whether transient helm requests are being received, and thus to respond to the helm requests differently. FIGS. 23-24 depict two examples of methods usable in performing logic segment L10 from FIG. 20, which provides for handling an acceleration downshift request when the marine vessel is not being operated at steady state. The two examples of logic segment L10 may be used independently (i.e., using only one) or used together.

FIG. 23 depicts a first method for identifying transient helm commands under logic segment L10. The requested speed or TOSS from the helm (subsegment L10a) is compared to the actual speed or TOSS measured for the marine propulsion device (subsegment L10f). The difference between the requested TOSS and the actual TOSS (also referred to as the TOSS error) is determined in subsegment L10b, which is compared to a threshold of acceptable TOSS errors (the calibration of subsegment L10g) to determine in subsegment L10c whether the TOSS error is within the threshold (e.g., 1500-2500 RPM).

The actual TOSS from subsegment L10f is also compared in subsegment L10i to a previous actual TOSS value (L10h), which is continuously replaced as new TOSS measurements are taken. The difference from subsegment L10i is compared to a threshold of allowable TOSS rates changes (subsegment L10k) to determine a whether the change in TOSS is less than the allowable threshold (e.g., 10-20 RPM).

In short, if the difference between the user requested TOSS and the actual TOSS exceeds the first threshold (subsegment L10g) and is not resolving at a suitable rate (the second threshold, subsegment L10k)—in other words, the actual TOSS is increasing at a change rate below a calibrated threshold—logic segment L10 outputs a TRUE values supporting a downshift (subsegment L10e), whereas downshift schedule for a steady state condition may have otherwise indicated a non-shift recommendation.

The downshift thus increases the actual TOSS being provided by the marine propulsion device to meet (or better approximate) the user's request. As shown by logic subsegment L10b in FIG. 23, this difference may be a simple subtraction between the requested TOSS of subsegment L10a and the actual TOSS at subsegment L10f. Likewise, the resultant TOSS error of the values after exceeding the thresholds may be subjected to an x out of y calculation in subsegment L10e as discussed above prior to reporting TRUE. A TRUE reporting signifies that the actual and requests TOSS value difference exceeds thresholds and is not resolving sufficiently quick, and thus provides that downshifting would provide better performance.

FIG. 24 depicts an additional or alternative method for determining and handling transient helm commands. This method also provides for calculating the TOSS error, but does so using a different technique. In particular, the TOSS error is calculated as a difference (subsegment L10m) between requested TOSS (subsegment L101) and actual TOSS (subsegment L10q). The difference is compared to a threshold (subsegment L10u) to determine in subsegment L10r whether the difference is less than the threshold (e.g., 100-300 RPM). The greater of the TOSS error and zero is determined in subsegment L10n, which is then fed into an integrator in subsegment L10o if the TOSS error is positive. The output of the integrator is also referred to as the change rate. In this manner, the TOSS error of subsegment L10m is integrated when more speed is being requested than is actually provided.

The integration (change rate) of the integrator in subsegment L10o is reset when the difference is below the threshold as determined in subsegment L10r. The integrator is also reset if the transmission is identified in subsegment L10w to not be in second gear F2 (in other words, if downshifting is not possible). If the integrated TOSS error from subsegment L10o exceeds a calibrated value (a third threshold, subsegment L10t, e.g. 4000-6000 RPM), a downshift is requested in subsegment L10p, once again using a calibration for non-steady state operation.

In the embodiment shown, the integrator is reset to zero when the transmission changes to second gear F2, and/or when the TOSS set point is achieved within a calibrated threshold. In addition to optimizing shifting performance, the present inventors have recognized that applying the method shown in FIGS. 23 and/or 24 for logic segment L10 also advantageously prevents a downshift following an impact to the propeller.

If either of the methods for logic segment 10 provide that transient (non-steady state) helm commands are present, the system 100 provides for downshifting the transmission 10 immediately, essentially overriding the downshift threshold of FIG. 12, for example (particularly where the downshift threshold is optimized for steady state helm commands). The present inventors have recognized that applying one or both of the methods of logic segment L10 above ensure that when a marine vessel is not accelerating as quickly as the user desires, the system appropriately downshifts to improve this acceleration.

Figure 25:
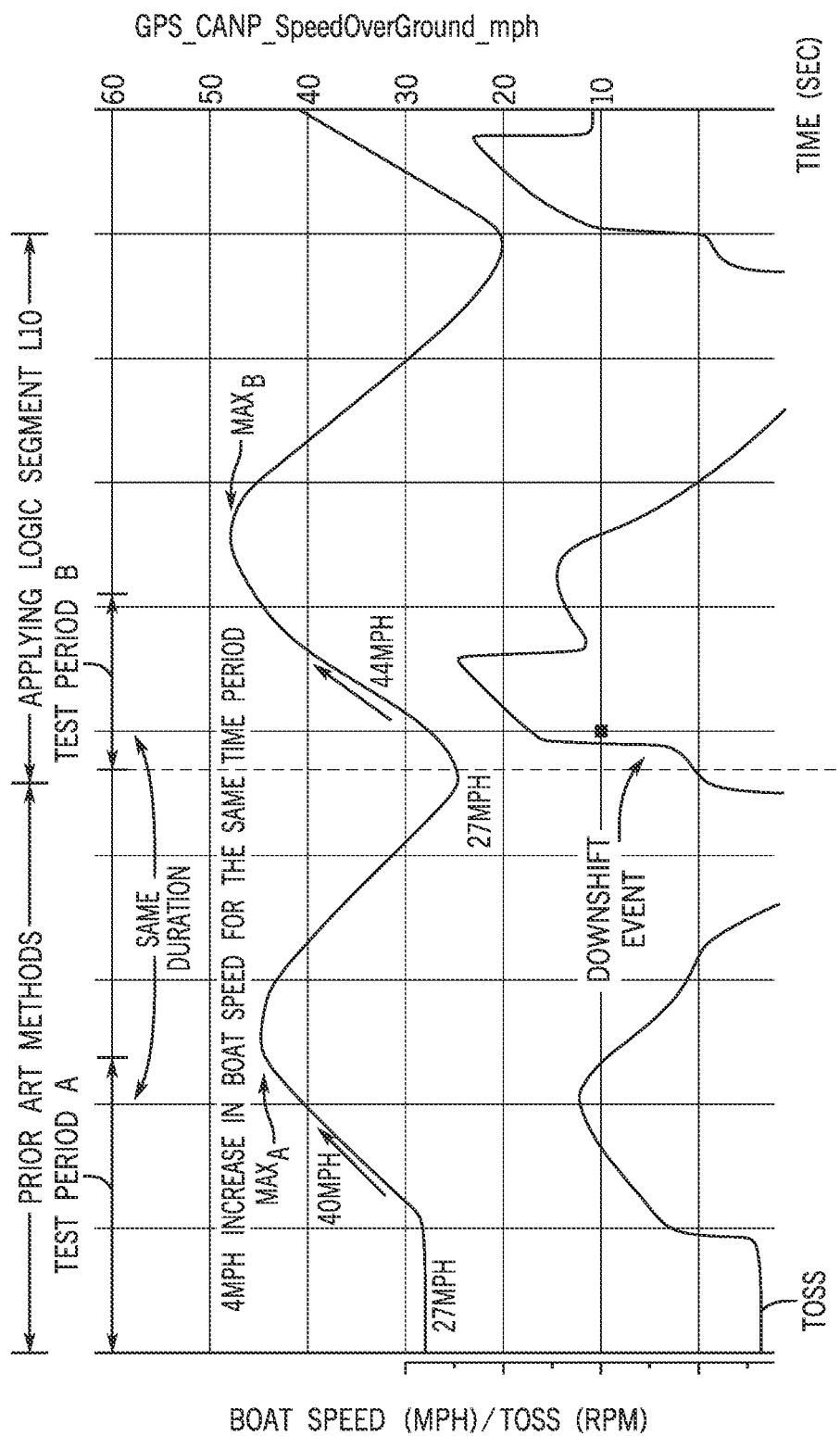
FIG. 25 is a graph depicting experimental data demonstrating an increase in boat speed when performing logic segment L10 of FIG. 20 over methods presently known in the art.

FIG. 25 depicts experimental data demonstrating an increase in boat speed when performing logic segment L10 of FIG. 20, as compared to methods presently known in the art. As can be seen, the prior art method (left) shows a marine vessel that reached a maximum speed of 40 mph (labeled $MAX_a$) when accelerating from 27 mph for a TEST $PERIOD_a$. When applying the methods of logic segment L10, it is determined that the marine vessel is not in steady state, but is transient (e.g., the user is requesting acceleration). Here, the same marine vessel reached a maximum speed of 44 mph (labeled $MAX_b$) when accelerating from 27 mph for the same test period (TEST $PERIOD_a$=TEST $PERIOD_b$). By identifying via logic segment L10 that the marine vessel is not being requested to operate in steady state, a different shifting calibration was able to be applied and additional performance was achieved for the marine propulsion device to cause the transmission to downshift accordingly.

Returning to FIG. 20, logic segments L11 and L12 provide for determinations of whether a follower marine propulsion device should follow a shift leader in downshifting. These logic segments are similar to logic segments L5 and L6 previously described for determining whether to follow the shift leader in upshifting as shown in FIG. 6. The same steps 1-4 of FIGS. 14-17 may generally be followed, though notably, step 1 now confirms that the RPM of the shift follower is not too high so as to reach the redline RPM if downshifted. Additional information for these logic segments is also shown in FIGS. 12 and 14-17.

FIG. 20 further depicts logic segment L13, which determines whether the time spent requesting second gear F2 exceeds a calibrated threshold. This prevents downshifting again quickly after first reaching second gear F2, which could result in multiple upshifts and downshifts in close succession. The present inventors have recognized that frequent automatic shifting is undesirable from a wear perspective, but also unpleasant for NVH and the operator's impression of the quality of the marine propulsion devices and overall marine vessel. Through experimentation and development, the present inventors have identified that, in certain configurations, shifting in less than 4 seconds from the previous shift is undesirable as it causes an inconsistent transition between the gears due to residual hydraulic fluid left in the clutch from the previous shift.

EXAMPLES

The following provides additional information for certain embodiments of systems and methods according to the present disclosure.

Example 1

According to one aspect of the present disclosure, there is provided a method for shifting a transmission for a marine propulsion device having a powerhead from a first gear to a second gear, the transmission being configured to transmit power from the powerhead to a transmission output shaft through the first gear and the second gear. The method further includes providing an upshift schedule defining upshift thresholds for shifting from the first gear to the second gear based on a controlled power for operating the marine propulsion device and a speed of the transmission output shaft, and determining the controlled power for operating the marine propulsion device. The method further includes measuring the speed of the transmission output shaft, and determining which one of the upshift thresholds in the shift schedule corresponds to the speed of the transmission output shaft. The method further includes comparing the controlled power determined for operating the marine propulsion device to the one of the upshift thresholds corresponding to the speed of the transmission output shaft in the shift schedule, and sending a signal to shift the transmission to the second gear when the controlled power determined for operating the marine propulsion device is below the one of the upshift thresholds corresponding to the speed of the transmission output shaft according to the shift schedule.

In certain embodiments, the controlled power is an RPM setpoint for operating the powerhead based on at least one component other than a user input.

In certain embodiments, the upshift schedule is a table, and wherein each of the speeds of the transmission output shaft correspond to exactly one of the upshift thresholds.

According to another aspect, there is provided a method for coordinating shifting of transmissions within marine propulsion devices, each of the marine propulsion devices having a powerhead rotating a driveshaft at a requested speed, and each of the transmissions having gears that are engageable with the driveshaft for the powerhead of the marine propulsion device corresponding thereto. The method includes assigning one of the marine propulsion devices as a shift leader and assigning another of the marine propulsion devices as a shift follower, and determining which of the gears is engaged for both the shift leader and the shift follower. The method further includes determining a desired gear among the gears to be engaged for both the shift leader and the shift follower, and identifying that the desired gear for the transmission of the shift leader has changed. The method further includes changing the desired gear of the shift follower to match the desired gear of the shift leader when at least one of: a difference between RPMs of the driveshafts of the shift leader and the shift follower is within an RPM difference threshold; the gears engaged for the shift leader and the shift follower are the same; a difference between the requested speeds of the driveshafts for the shift leader and the shift follower is within a requested speed difference threshold; and the RPM of the driveshaft for the shift follower is within an allowable range.

According to another aspect, there is provided a method for shifting a transmission for a marine propulsion device having a powerhead from a second gear to a first gear, the transmission being configured to transmit power from the powerhead to a transmission output shaft through the first gear and the second gear. The method includes providing a shift schedule defining downshift thresholds based on a controlled power for operating the marine propulsion device and a speed of the transmission output shaft, and determining the controlled power for operating the marine propulsion device. The method further includes measuring the speed of the transmission output shaft, and determining which one of the downshift thresholds in the shift schedule corresponds to the speed of the transmission output shaft. The method further includes comparing the controlled power determined for operating the marine propulsion device to the one of the downshift thresholds corresponding to the speed of the transmission output shaft in the shift schedule, and sending a signal to shift the transmission to the first gear when the controlled power determined for operating the marine propulsion device exceeds the one of the downshift thresholds corresponding to the speed of the transmission output shaft according to the shift schedule.

In certain embodiments, the controlled power is an RPM setpoint for operating the powerhead based on at least one component other than a user input.

In certain embodiments, the shift schedule is a table, and wherein each of the speeds corresponds to exactly one of the downshift thresholds.

According to another aspect, there is provided a method for shifting a transmission for a marine propulsion device having a powerhead between first and second gears, the transmission being configured to transmit power from the powerhead to a transmission output shaft through the first gear and the second gear, where the marine propulsion device is configured to receive a requested speed for controlling a speed of the transmission output shaft. The method includes providing a downshift threshold within a downshift schedule defining when to shift between the first gear and the second gear, and determining whether the requested speed is transient. The method further includes shifting the transmission based on the downshift threshold when the requested is determined to be non-transient, and based on other than the downshift threshold when the requested speed is determined to be transient.

In certain embodiments, the method further includes measuring a speed of the transmission output shaft, wherein determining whether the requested speed is transient includes calculating an error between the requested speed and the speed measured for the transmission output shaft.

In certain embodiments, determining whether the requested speed is transient includes at least one of: determining that the error exceeds a first threshold and is reducing at a rate below a second threshold, and determining that the error integrated over time exceeds a third threshold.

According to another aspect, there is provided a method for shifting a transmission of a marine propulsion device having a powerhead from a first gear to a second gear, the first and second gears being engageable with a driveshaft rotated by the powerhead, where the powerhead has a redline RPM for rotating the driveshaft, and where shifting from the first gear to the second gear takes a transition time to complete. The method includes providing first and second RPM thresholds, measuring an RPM of the driveshaft, and determining when the RPM surpasses the first RPM threshold and consequently starting a timer. The method further includes determining when the RPM surpasses the second RPM threshold and determining an elapsed time between the RPM surpassing the second RPM threshold and surpassing the first RPM threshold, and determining a redline prevention shift RPM, based on the elapsed time, such that the RPM measured will remain below the redline RPM during the transition time of shifting to the second gear. The method further includes sending a signal to shift the transmission to the second gear when the RPM measured for the driveshaft reaches the redline prevention shift RPM.

In certain embodiments, the method further includes resetting the timer when the RPM measured for the driveshaft falls below the first RPM threshold.

In certain embodiments, the method further includes providing a redline prevention table that provides the redline prevention shift RPM for shifting the transmission based on the elapsed time.

In certain embodiments, the signal to shift the transmission overrides other signals requesting to remain in the first gear to prevent the powerhead from exceeding the redline RPM.

In certain embodiments, the powerhead is one of a plurality of powerheads, and wherein at least one of the first RPM threshold, the second RPM threshold, and the redline prevention shift RPM varies within the redline prevention table across the plurality of powerheads.

Example 2

According to another aspect, there is provided a method for shifting a multi-speed transmission of a marine propulsion device between a first gear and a second gear each configured to transmit torque from a powerhead to a transmission output shaft. The method includes determining an actual power level requested for operating the marine propulsion device and measuring a transmission output shaft speed in which the transmission output shaft is rotating. The method further includes comparing the actual power level to a shift threshold, the shift threshold corresponding to expected power levels for operating the marine propulsion device as a function of the transmission output shaft speed of the transmission output shaft. The method further includes controlling the multi-speed transmission to shift when the actual power is outside the shift threshold.

In certain embodiments, the shift threshold includes a table corresponding to only one of upshifting from the first gear to the second gear and downshifting from the second gear to the first gear.

In certain embodiments, the multi-speed transmission is controlled to shift from the first gear to the second gear when the actual power is below the shift threshold.

In certain embodiments, the actual controlled power relates to the RPM of the powerhead.

In certain embodiments, the transmission output shaft speed is measured by a sensor that measures rotation of the transmission output shaft. In further embodiments, the sensor is a Hall-effect sensor.

In certain embodiments, the actual controlled power is requested based on a helm thrust command received from an operator and also based on at least one of: cruise control logic, launch control logic, docking mode control logic, and safeguard logic.

Certain embodiments further include counting an elapsed time during which the actual power is outside the shift threshold and controlling the multi-speed transmission to shift only after the elapsed time exceeds a time threshold.

In certain embodiments, the shift threshold is also a function of which of the first gear and the second gear is engaged between the powerhead and the transmission output shaft.

Certain embodiments further include, before controlling the multi-speed transmission to shift, determining a difference between the transmission output shaft speed measured and a product of the actual power level and a gear ratio of the first gear, comparing the difference to a difference threshold, and controlling the multi-speed transmission to shift when the actual power is outside the shift threshold after determining that the difference is within the difference threshold.

In certain embodiments, the shift threshold comprises an upshift threshold within an upshift schedule for determining when to shift from the first gear to the second gear and a downshift threshold within a downshift schedule for determining when to shift from the second gear to the first gear, further comprising selecting between at least the upshift threshold and the downshift threshold for comparing to the actual power level based on which of the first gear and the second gear is engaged between the powerhead and the transmission output shaft. Further embodiments further include the upshift schedule and the downshift schedule as tables. Further embodiments further include controlling the multi-speed transmission to shift from the first gear to the second gear when the actual power is below the upshift threshold and to shift from the second gear to the first gear when the actual power is above the downshift threshold. Further embodiments further include counting an elapsed time since the multi-speed transmission was previously shifted, and controlling the multi-speed transmission to shift again only after the elapsed time exceeds a time threshold.

According to another aspect, there is provided a multi-speed transmission for a marine propulsion device. The multi-speed transmission is configured to transmit torque from a powerhead to a propulsor. The multi-speed transmission includes a first gear and a second gear each engageable to transmit the torque between the powerhead and the propulsor. A transmission output shaft is rotatable by the first gear and by the second gear so as to transmit the torque to the propulsor. A transmission output shaft speed sensor is operatively coupled to measure the transmission output shaft speed of the transmission output shaft. A shift schedule includes a shift threshold corresponding to expected power levels for operating the marine propulsion device as a function of possible transmission output shaft speeds for the transmission output shaft. A control system is operatively coupled to the transmission output shaft speed sensor, where the control system is configured to receive an actual power level requested for operating the marine propulsion device, to receive the measured transmission output shaft speed, to compare the actual power level to the shift threshold corresponding to the transmission output shaft speed as the possible transmission output shaft speed, and to control the multi-speed transmission to shift when the actual power is outside the shift threshold.

In certain embodiments, the shift schedule includes a table corresponding to only one of upshifting from the first gear to the second gear and downshifting from the second gear to the first gear.

In certain embodiments, the actual controlled power relates to the RPM of the powerhead.

In certain embodiments, the shift threshold is also a function of which of the first gear and the second gear is engaged between the powerhead and the transmission output shaft.

In certain embodiments, the shift threshold comprises an upshift threshold within an upshift schedule for determining when to shift from the first gear to the second gear and a downshift threshold within a downshift schedule for determining when to shift from the second gear to the first gear, further comprising selecting between at least the upshift threshold and the downshift threshold for comparing to the actual power level based on which of the first gear and the second gear is engaged between the powerhead and the transmission output shaft.

According to another aspect, there is provided a method for shifting a multi-speed transmission of a marine propulsion device between a first gear and a second gear each configured to transmit torque from a powerhead to a transmission output shaft. The method includes determining an actual power level requested for operating the marine propulsion device and determining which of the first gear and the second gear is engaged between the powerhead and the transmission output shaft. The method further includes measuring a transmission output shaft speed in which the transmission output shaft is rotating. The method further includes comparing, when the first gear is engaged between the powerhead and the transmission output shaft, the actual power level to one of the plurality of upshift thresholds each corresponding to expected power levels for operating the marine propulsion device as a function of the transmission output shaft speed of the transmission output shaft, the plurality of upshift thresholds being stored in an upshift schedule table. The method further includes comparing, when the second gear is engaged between the powerhead and the transmission output shaft, the actual power level to one of the plurality of downshift thresholds each corresponding to expected power levels for operating the marine propulsion device as a function of the transmission output shaft speed of the transmission output shaft the plurality of downshift thresholds being stored in a downshift schedule table. The method further includes controlling the multi-speed transmission to shift from the first gear to the second gear when the actual power is less than the one of the plurality of upshift thresholds and controlling the multi-speed transmission to shift from the second gear to the first gear when the actual power is greater than the one of the plurality of downshift thresholds.

Example 3

According to another aspect, there is provided a method for downshifting a multi-speed transmission of a marine propulsion device to a first gear from a second gear each configured to transmit torque from a powerhead to a propulsor. The method includes providing a shift schedule that indicates a shift recommendation for when to downshift from the second gear to the first gear, where the powerhead rotating at a given RPM rotates the propulsor in first gear at a lower RPM than the second gear. The method further includes configuring the multi-speed transmission to downshift when the shift schedule indicates the shift recommendation. The method further includes determining a requested speed of the marine propulsion device and measuring an actual speed of the marine propulsion device. The method further includes calculating an error between the requested speed and the actual speed and comparing the error to an error threshold and determining when the error has exceeded the error threshold longer than a duration threshold. The method further includes controlling the multi-speed transmission to downshift, despite the shift schedule indicating a non-shift recommendation, when the duration threshold is exceeded so as to reduce the error between the requested speed and the actual speed.

In certain embodiments, the propulsor is operatively coupled to a transmission output shaft that receives the torque from the powerhead via engagement of the first gear and the second gear, and wherein the actual speed is a transmission output shaft speed (TOSS) of the transmission output shaft. In further embodiments, the requested speed is determined as a function of an RPM of the powerhead and a gear ratio of the second gear. Further embodiments include providing a sensor for measuring the TOSS.

In certain embodiments, the error is calculated at repeated time intervals, and the duration threshold is a number of the repeated time intervals in which the error that is calculated exceeds the error threshold. In further embodiments, the error between the requested speed and the actual speed is calculated as a difference between the requested speed and the actual speed, where the error calculated in successive intervals of the repeated time intervals are subtracted to calculate a change rate, the method further including, before controlling the multi-speed transmission to downshift, comparing the change rate to a change rate threshold, and further including controlling the multi-speed transmission to downshift when the change rate is below the change rate threshold. In further embodiments, the change rate is a first change rate and the change rate threshold is a first change rate threshold, the method further including integrating the difference between the requested speed and the actual speed over time to calculate a second change rate, and the method further including, before controlling the multi-speed transmission to downshift, comparing the second change rate to a second change rate threshold, and further comprising controlling the multi-speed transmission to downshift when the second change rate is below the second change rate threshold.

In certain embodiments, the error between the requested speed and the actual speed is calculated as a difference between the requested speed and the actual speed, where the difference is integrated over time to calculate a change rate, the method further including, before controlling the multi-speed transmission to downshift, comparing the change rate to a change rate threshold, and further comprising controlling the multi-speed transmission to downshift when the change rate is above the change rate threshold.

In certain embodiments, the requested speed is based at least in part on operator input. In further embodiments, the operator input is based at least in part on a position of a throttle lever.

Certain embodiments further include counting an elapsed time since the change rate was determined to exceed the change rate threshold, and controlling the multi-speed transmission to downshift only after the elapsed time exceeds a time threshold. In further embodiments, the change rate is reset when the error between the requested speed and the actual speed falls below the error threshold. In further embodiments, the change rate threshold is between 100 and 300 RPM. In further embodiments, the change rate is reset after the multi-speed transmission shifts.

Certain embodiments further include controlling the multi-speed transmission to downshift only when the first gear is presently disengaged.

Certain embodiments further include, before controlling the multi-speed transmission to downshift, comparing an RPM of the powerhead to an RPM threshold, and further comprising controlling the multi-speed transmission to downshift only when the RPM of the powerhead is below the RPM threshold so as to avoid the powerhead exceeding a redline value after downshifting.

According to another aspect, there is provided a marine propulsion device having a powerhead that transmits torque to a propulsor. The marine propulsion device includes a multi-speed transmission having a first gear, a second gear, and a transmission output shaft operatively coupled to the propulsor, where the first gear and the second gear are selectively engageable to transmit the torque from the powerhead to the transmission output shaft to rotate the propulsor. A shift schedule indicates a shift recommendation for when to downshift the multi-speed transmission from the second gear to the first gear, where the powerhead rotating at a given RPM rotates the propulsor in first gear at a lower RPM than the second gear. A control system is configured to cause the multi-speed transmission to downshift when the shift schedule indicates the shift recommendation. The control system is further configured to determine a requested speed of the marine propulsion device and to measure an actual speed of the marine propulsion device. The control system is further configured to calculate an error between the requested speed and the actual speed and to compare the error to an error threshold and to determine when the error has exceeded the error threshold longer than a duration threshold. The control system is further configured to cause the multi-speed transmission to downshift, despite the shift schedule indicating a non-shift recommendation, when the duration threshold is exceeded so as to reduce the error between the requested speed and the actual speed.

Certain embodiments further include a sensor operatively coupled to measure a transmission output shaft speed (TOSS) at which the transmission output shaft rotates, where the actual speed is the TOSS, and where the requested speed is determined as a function of an RPM of the powerhead and a gear ratio of the second gear.

In certain embodiments, the error is calculated at repeated time intervals, where the duration threshold is a number of the repeated time intervals in which the error that is calculated exceeds the error threshold, where the error between the requested speed and the actual speed is calculated as a difference between the requested speed and the actual speed, where the error calculated in successive intervals of the repeated time intervals are subtracted to calculate a change rate, and where the control system is further configured to, before causing the multi-speed transmission to downshift, compare the change rate to a change rate threshold, and to cause the multi-speed transmission to downshift when the change rate is below the change rate threshold.

In certain embodiments, the error between the requested speed and the actual speed is calculated as a difference between the requested speed and the actual speed, where the difference is integrated over time to calculate a change rate, and where the control system is further configured to, before controlling the multi-speed transmission to downshift, compare the change rate to a change rate threshold, and to cause the multi-speed transmission to downshift when the change rate is below the change rate threshold.

Example 4

According to another aspect, there is provided a method for shifting a multi-speed transmission of a marine propulsion device between a first gear and a second gear each configured to transmit torque from a powerhead to a propulsor, where the powerhead has a redline RPM and the multi-speed transmission has a transition time for completing a shift. The method further includes measuring an RPM of the powerhead and comparing the RPM to a first RPM threshold, and starting a timer when the RPM exceeds the first RPM threshold, wherein the timer is reset when the RPM falls below the first RPM threshold. The method further includes measuring the RPM of the powerhead after the first RPM threshold is exceeded and comparing the RPM to a second RPM threshold that is different than the first RPM threshold, and stopping the timer when the RPM exceeds the second RPM threshold and determining an elapsed time between starting and stopping the timer. The method further includes determining a shift RPM based on the determined elapsed time, the redline RPM of the powerhead, and the transition time of the multi-speed transmission. The method further includes controlling the multi-speed transmission to shift when the RPM measured for the powerhead reaches the shift RPM such that the shifting completes before the RPM of the powerhead reaches the redline RPM.

Certain embodiments further include determining the shift RPM for controlling the multi-speed transmission each time the RPM of the powerhead exceeds the second RPM threshold.

In certain embodiments, the determination of the shift RPM is repeated at periodic intervals during use of the marine propulsion device. In further embodiments, the shift RPM determined at a first interval is replaced by the shift RPM determined at a subsequent second interval for controlling the multi-speed transmission. Further embodiments also include receiving an operator input for controlling the RPM of the powerhead, where the timer is reset when the operator input is determined to change after the first RPM threshold is exceeded.

In certain embodiments, the shift RPM is first determined before any shifting from the first gear to the second gear for the multi-speed transmission.

In certain embodiments, the second RPM threshold is at most 95% of the redline RPM.

In certain embodiments, the first RPM threshold is at least 70% of the redline RPM.

In certain embodiments, the first RPM threshold and the second RPM threshold differ by at most 25% of the redline RPM.

In certain embodiments, the first RPM threshold and the second RPM threshold differ by at least 5% of the redline RPM.

In certain embodiments, the redline RPM is between 6000 RPM and 8000 RPM, and the second RPM threshold is between 200 RPM and 1000 RPM less than the redline RPM.

In certain embodiments, the transition time of the multi-speed transmission is between 0.2 seconds and 2 seconds.

In certain embodiments, the shift RPM is selected from a plurality of shift RPMs provided in a shift table. In further embodiments, the shift table is one of a plurality of shift tables corresponding to which of the first gear and the second gear is presently engaged to transmit torque from the powerhead to the propulsor.

In certain embodiments, the shift RPM is calculated, where calculating the shift RPM includes solving an acceleration rate as a difference between the second RPM threshold and the first RPM threshold with the difference being divided by the determined elapsed time.

According to another aspect, there is provided a marine propulsion device having a powerhead configured to generate torque for rotating a propulsor, the powerhead having a redline RPM. A multi-speed transmission has a first gear and a second gear each selectively engageable to transmit the torque from the powerhead to the propulsor. The multi-speed transmission has a transition time for completing a shift between the first gear and the second gear. A sensor is operatively coupled to measure an RPM of the powerhead. A control system is operatively coupled to the multi-speed transmission and to the sensor. The control system is configured to receive the RPM of the powerhead and compare the RPM to a first RPM threshold, and to start a timer when the RPM exceeds the first RPM threshold, where the timer is reset when the RPM falls below the first RPM threshold. The control system is further configured to receive the RPM of the powerhead after the first RPM threshold is exceeded and compare the RPM to a second RPM threshold that is different than the first RPM threshold. The control system is further configured to stop the timer when the RPM exceeds the second RPM threshold and determine an elapsed time between starting and stopping the timer. The control system is further configured to determine a shift RPM based on the determined elapsed time, the redline RPM of the powerhead, and the transition time of the multi-speed transmission. The control system is further configured to cause the multi-speed transmission to shift when the RPM measured for the powerhead reaches the shift RPM such that the shifting completes before the RPM of the powerhead reaches the redline RPM.

In certain embodiments, the control system is configured to determine the shift RPM for causing the multi-speed transmission to shift each time the RPM of the powerhead exceeds the second RPM threshold.

In certain embodiments, the second RPM threshold is at most 95% of the redline RPM, the first RPM threshold is at least 70% of the redline RPM, and the first RPM threshold and the second RPM threshold differ by at least 5% of the redline RPM.

In certain embodiments, the shift RPM is selected from a plurality of shift RPMs provided in a shift table.

In certain embodiments, the shift RPM is calculated, where calculating the shift RPM comprises solving an acceleration rate as a difference between the second RPM threshold and the first RPM threshold with the difference being divided by the determined elapsed time.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method for shifting a multi-speed transmission of a marine propulsion device between a first gear and a second gear each configured to transmit torque from a powerhead to a propulsor, wherein the powerhead has a redline RPM and the multi-speed transmission has a transition time for completing a shift, the method comprising:
    measuring an RPM of the powerhead and comparing the RPM to a first RPM threshold;
    starting a timer when the RPM exceeds the first RPM threshold, wherein the timer is reset when the RPM falls below the first RPM threshold;
    measuring the RPM of the powerhead after the first RPM threshold is exceeded and comparing the RPM to a second RPM threshold that is different than the first RPM threshold;
    stopping the timer when the RPM exceeds the second RPM threshold and determining an elapsed time between starting and stopping the timer;
    determining a shift RPM based on the determined elapsed time, the redline RPM of the powerhead, and the transition time of the multi-speed transmission; and
    controlling the multi-speed transmission to shift when the RPM measured for the powerhead reaches the shift RPM such that the shifting completes before the RPM of the powerhead reaches the redline RPM.

2. The method according to claim 1, further comprising determining the shift RPM for controlling the multi-speed transmission each time the RPM of the powerhead exceeds the second RPM threshold.

3. The method according to claim 1, wherein the determination of the shift RPM is repeated at periodic intervals during use of the marine propulsion device.

4. The method according to claim 3, wherein the shift RPM determined at a first interval is replaced by the shift RPM determined at a subsequent second interval for controlling the multi-speed transmission.

5. The method according to claim 4, further comprising receiving an operator input for controlling the RPM of the powerhead, wherein the timer is reset when the operator input is determined to change after the first RPM threshold is exceeded.

6. The method according to claim 1, wherein the shift RPM is first determined before any shifting from the first gear to the second gear for the multi-speed transmission.

7. The method according to claim 1, wherein the second RPM threshold is at most 95% of the redline RPM.

8. The method according to claim 1, wherein the first RPM threshold is at least 70% of the redline RPM.

9. The method according to claim 1, wherein the first RPM threshold and the second RPM threshold differ by at most 25% of the redline RPM.

10. The method according to claim 1, wherein the first RPM threshold and the second RPM threshold differ by at least 5% of the redline RPM.

11. The method according to claim 1, wherein the redline RPM is between 6000 RPM and 8000 RPM, and wherein the second RPM threshold is between 200 RPM and 1000 RPM less than the redline RPM.

12. The method according to claim 1, wherein the transition time of the multi-speed transmission is between 0.2 seconds and 2 seconds.

13. The method according to claim 1, wherein the shift RPM is selected from a plurality of shift RPMs provided in a shift table.

14. The method according to claim 13, wherein the shift table is one of a plurality of shift tables corresponding to which of the first gear and the second gear is presently engaged to transmit torque from the powerhead to the propulsor.

15. The method according to claim 1, wherein the shift RPM is calculated, and wherein calculating the shift RPM comprises solving an acceleration rate as a difference between the second RPM threshold and the first RPM threshold with the difference being divided by the determined elapsed time.

16. A marine propulsion device comprising:
a powerhead configured to generate torque for rotating a propulsor, the powerhead having a redline RPM;
a multi-speed transmission having a first gear and a second gear selectively engageable to transmit the torque from the powerhead to the propulsor, the multi-speed transmission having a transition time for completing a shift between the first gear and the second gear;
a sensor operatively coupled to measure an RPM of the powerhead;
a control system operatively coupled to the multi-speed transmission and to the sensor, the control system being configured to:
receive the RPM of the powerhead and compare the RPM to a first RPM threshold;
start a timer when the RPM exceeds the first RPM threshold, wherein the timer is reset when the RPM falls below the first RPM threshold;
receive the RPM of the powerhead after the first RPM threshold is exceeded and compare the RPM to a second RPM threshold that is different than the first RPM threshold;
stop the timer when the RPM exceeds the second RPM threshold and determine an elapsed time between starting and stopping the timer;
determine a shift RPM based on the determined elapsed time, the redline RPM of the powerhead, and the transition time of the multi-speed transmission; and
cause the multi-speed transmission to shift when the RPM measured for the powerhead reaches the shift RPM such that the shifting completes before the RPM of the powerhead reaches the redline RPM.

17. The marine propulsion device according to claim 16, wherein the control system is configured to determine the shift RPM for causing the multi-speed transmission to shift each time the RPM of the powerhead exceeds the second RPM threshold.

18. The marine propulsion device according to claim 16, wherein the second RPM threshold is at most 95% of the redline RPM, the first RPM threshold is at least 70% of the redline RPM, and the first RPM threshold and the second RPM threshold differ by at least 5% of the redline RPM.

19. The marine propulsion device according to claim 16, wherein the shift RPM is selected from a plurality of shift RPMs provided in a shift table.

20. The marine propulsion device according to claim 16, wherein the shift RPM is calculated, and wherein calculating the shift RPM comprises solving an acceleration rate as a difference between the second RPM threshold and the first RPM threshold with the difference being divided by the determined elapsed time.

* * * * *